3,503,745
**DYE SENSITIZATION OF LIGHT
SENSITIVE SYSTEMS**
Yoshikazu Yamada, Sierra Madre, and Thomas H. Garland, El Monte, Calif., assignors to Bell & Howell Company, Chicago, Ill., a corporation of Illinois
Continuation-in-part of applications Ser. No. 481,759, Aug. 23, 1965, and Ser. No. 352,625, Mar. 17, 1964, in which both applications are continuations-in-part of application Ser. No. 278,050, May 6, 1963. This application Jan. 28, 1966, Ser. No. 523,705
Int. Cl. G03c 1/52
U.S. Cl. 96—90                                18 Claims

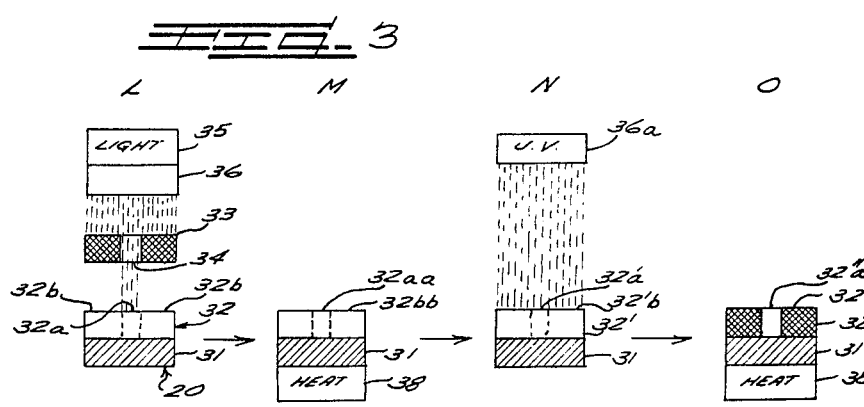

ABSTRACT OF THE DISCLOSURE

A photosensitive composition and method for preparation thereof, in which an aryl amine or N-vinyl compound and organic halogen compound are dispersed in a normally hydrophilic continuous phase, and there is added a photographic sensitizing dye material, separate and distinct from the other components and which effects a photosensitive spectral response to the composition which is different from the spectral response of each of the other components or the combination thereof.

---

This application is a continuation-in-part of applications Ser. Nos. 481,759, filed Aug. 23, 1965, entitled "Production and Use of Photosensitive Compositions and Films" and 352,625, filed Mar. 17, 1964, now abanboned, entitled "Dye Sensitization of Photosensitive Materials," both of which applications are continuations-in-part of Ser. No. 278,050, filed May 6, 1963, now abandoned, entitled "Production and Use of Photosensitive Compositions and Films."

The instant invention relates generally to the photographic art, and more particularly, to improved methods of producing photographic or photosensitive compositions, films or articles, and to improved photographic methods relating thereto, and the instant invention further relates to the photographic or photosensitive compositions, films or articles obtained.

The instant invention relates to compositions which are sensitive to light and which are suitable for photography and photographic reproduction purposes. The instant invention also relates to the preparation of such comopsitions, and photographic films or similar articles from such compositions. The instant invention also relates to the production of stable, colored, printout and developable images produced by exposure to light and/or to light and heat of certain photosensitive combinations of materials or agents.

In general, it is old and well known in the photographic arts to provide photographic systems involving two or more materials which react under the influence of actinic light to produce a color. As early as 1921, Murray C. Beebe and his co-workers described numerous photographic systems, involving in some instances halogen compounds (e.g., iodoform and others) in allegedly color-producing association with other materials such as tung oil varnish, which could contain colored aromatic amine dyes such as Rhodamine (U.S. Patent No. 1,574,375), asphaltum (U.S. Patents Nos. 1,575,143 and 1,587,271), phenolic condensation products (U.S. Patent No. 1,587,271, and miscellaneous others (U.S. Patents Nos. 1,587,273; 1,587,274; 1,604,674; 1,618,505; 1,655,127; 1,658,510; and 1,820,593). Beebe also disclosed an allegedly photographic use for the known photo-condensation of furfural and aniline which involved photosensitizing a mixture thereof "by adding a small amount of iodoform, or any compound which will liberate iodine when it is exposed to light" (U.S. Patent No. 1,587,269, page 2, lines 89–93); and Beebe referred to this last-mentioned patent disclosure later (in U.S. Patent No. 1,587,272) in adding condensations of benzaldehyde and aniline, dimethyl aniline or benzyl aniline to his list of systems allegedly responsive to actinic light in the presence of sensitizing agents such as iodoform.

Even up to the present time, workers have continued to study photographic systems of the general type which involve actinic light induced color-forming reactions between two or more materials. In U.S. Patents Nos. 3,042,515; 3,042,516; 3,042,517; 3,042,518; 3,042,519; 3,046,125; and 3,056,673; issued to Eugene Wainer, and U.S. Patent No. 3,082,086 issued to Robert Sprague, photographic systems are described involving photosensitive systems of materials which include halogen-containing and nitrogen-containing compounds.

The foregoing Wainer and Sprague disclosures are concerned primarily with systems involving solutions or homogeneous systems which include the so-called light responsive reactants. The same is also true of British Specification No. 917,919 (e.g., col. 2, page 3) and Belgian Patent No. 596,094 (e.g., Examples 48 and 54 among others).

Although the instant invention is not limited to the use of the aforesaid systems, or the theories and/or principles described in such patents, it will be apparent from the following description of the instant invention that many of the various materials described in these patents to Beebe, Wainer and/or Sprague may be used in the practice of the instant invention. In fact, the instant invention contemplates the use of two or more ingredients, each of which per se may have been known in the prior art, and which may have been understood by prior workers in the art to be capable of coreaction in response to actinic light to produce colors. The instant invention, however, involves certain new and unique methods of combination and certain new and unique combinations of such materails. The combinations of the invention are novel in physical and/or chemical aspects thereof, and the methods of producing the same are also novel with respect to physical and/or chemical aspects. These combinations of the invention, and the compositions and physical state in which they are produced in the practice of the invention, have been found to produce a number of advantages in the field of photography, which include improved and controlled photosensitivity, economic and simplified formulation, superior photographic results and the like.

The foregoing "photographic" or photosensitive systems referred to in the previous disclosures mentioned herein will fall in the general category of non-silver photographic systems, in that they do not ordinarily employ the conventional silver halide as the principal photoresponsive chemical. Instead, they employ two materials which may or may not individually or alone exhibit photoresponse, but which will exhibit color change or color forming photoresponse when used not only in the combinations of the solutions shown in the prior art but also when used in the intimate dispersed phase combinations of the instant invention, which latter systems have been described in considerable detail in our co-opending application Ser. No. 278,050 and 278,419, both filed May 6, 1963, now abandoned; Ser. No. 352,625, filed Mar. 17, 1964; Ser. No. 481,759, filed Aug. 23, 1965; and Ser. No. 508,390, filed Nov. 17, 1965; which disclosures disclose in part the subject matter of the instant invention and are incorporated herein by reference.

It will be appreciated that an important feature of the instant invention resides in the particular combination of dispersed phase and continuous phase systems described in our previous applications and which will be described in further detail herein; but in addition, the instant invention is concerned with certain unique aspects of the use of photographic sensitizing dyes in this new environment. It must be appreciated that the photographic systems of the instant invention, as well as the solution of materials which are described in the previously mentioned patents and publications in this specification are not so-called "silver" photographic systems with which the so-called "photographic sensitizing dyes" are known to be used and the use thereof has been studied in elaborate detail over perhaps the past century. For example, attention is directed to a 1957 publication of Brooker and Vittum entitled "A Century of Progress in the Synthesis of Dyes for Photography" in volume 5 of the 1957 Journal of Photographic Science, pages 71 et seq., which publication traces the history of photographic sensitizing dyes from its early beginnings until substantially the present time, although always relating the use of such dyes to sliver photography. The descriptions, teachings and principles of the Brooker and Vittum publication have a certain degree of relationship to the inventive concepts here involved and this publication is also incorporated herein by reference for this purpose.

A fundamental and essential difference, however, between the subject matter of Brooker and Vittum and the present subject matter is that the present subject matter is concerned not with silver photography and the dye sensitization thereof but with non-silver photography or photosensitive systems which involve the coreaction of the least two ingredients to obtain a particular type of color-forming reaction that is fundamentally different and distinct from the photoresponse of either of these reactants individually or in the presence of materials other than the coreactant hereof. In referring to color production and color response, we are referring to selective light absorptivity and not necessarily (although usually) visible color changes. Thus a striking coreaction between the ingredients of the instant invention that may be sensitized by a dye used in accordance with the invention may involve what constitutes visibly a nominal or almost imperceptible change in color, although involving a very drastic change in selective light absorptivity at either of the extremities of the so-called visible light range.

It will further be appreciated that certain of the prior art disclosures relating to non-silver systems, in solution, such as those of Wainer and Beebe have made general mention of the use of photographic sensitizing dyes, or at least have described the use of dyes which are known in silver halide chemistry to be photographic sensitizing dyes. These descriptions, however, relate to systems wherein the alleged color-forming coreactants are essentially in solution or homogeneous compositon in systems involving substantially the entire film or body that is being photo-excited. In contrast, in the practice of the instant invention, the environment involved is new. The environment of the instant invention involves not only a substantially continuous generally photo-inert vehicle or carrier, but also a dispersed phase of photosensitive coreactant; and it is in this new and different environment that the present photographic sensitizing dyes are used in certain specific systems and manners which will be described in detail hereinafter. It should be noted, however, at this time that the term photographic sensitizing dye is used in the practice of the instant invention and in this particular disclosure in its generic sense to refer to a dye which actually effects a different spectral response from that inherent in the system prior to the incorporation of such sensitizing dye therein. Thus in a given dispersion, we may find that the dispersed phase consists of an intimate combination of a pair of colorless coreactants, each of which has its own individual selective light absorptivity and which may in combination have a different selective light absorptivity (or a cumulative one resulting from the combination of the two reactants). In any event, the system will have a distinct range and probably distinct peak or peaks for light absorptivity and, since this system is photoresponsive, it will be photoresponsive when excited by light within such range of absorptivity. This range of absorptivity will thus be the essence of one important definition of the spectral response of the system (in the absence of the senitizing dye). The inclusion of the sensitizing dy in accordance with the instant invention will, however, effect an altered or different spectral response, which means that there will still be a definite spectral response, but it will be altered. The spectral response may be altered by, for example, increasing the overall range (in wave lengths of light) which the system will absorb and to which the system is, therefore, photoresponsive. In contrast, the spectral response may be altered so that the range is actually decreased or even changed from the original range, so that the spectral response will be more selective to a particular wave length of light. Additionally, the spectral response may be altered in the instant systems so that the actual sensitivity or speed of response, in the photographic sense, will be accelerated or decelerated by the presence of the sensitizing dye, in response to exposure to the same total amount of light energy or the same total amount of light energy in a given wave length or band. All of these different spectral responses will be discussed and demonstrated in detail hereinafter.

It is, therefore, an important object of the instant invention to provide improved photographic compositions, films or other articles, and improved methods of producing and/or using the same, including improved photographic process.

Other and further objects, features and advantatges of the present invention will become apparent to those skilled in the art from the following detailed description thereof and the drawings attached hereto and made a part hereof.

On the drawings:

FIGURE 1 is an essentially diagrammatic view showing a photographic sequence of a positive-working embodiment of the invention;

FIGURE 2 is an essentially diagrammatic view showing a photographic sequence of a negative-working embodiment of the invention; and FIGURE 3 is an essentially diagrammatic view showing still another photographic sequence of a positive-working embodiment of the instant invention.

As shown on the drawings:

In FIGURE 1 a photographic sequence is indicated generally by the three stations designated A, B and C, which represent a sequence for a positive-working photographic system of the invention. In the first Step A, a photosensitive element of the invention indicated generally by the reference numeral 10 is provided with a paper backing 11 and a photosensitive film or layer 12 which is subjected to an "image-wise exposure" by being exposed to the projection of an image 13 of a color transparency 14, with such image 13 being projected by a conventional source 15 of visible actinic light, which in this particular instance is a tungsten lamp (indicated diagrammatically). The actinic light from the source 15 is absorbed by the image 13 but otherwise passes through the transparency 14 so as to impose a latent image on the photosensitive layer 12. The areas 12a, 12a thus exposed on the photosensitive layer 12 are referred to as "light struck" whereas the area 12b (behind the image 13) is referred to as a "non-light-struck" area. The non-light-struck area 12b indicated at station A is, of course, not exposed to such actinic light.

Next, at station B, the previously exposed photographic film or layer 12' is subjected to a blanket or "non-image" exposure from a second light source 16a, which in this case is a "black light" or near ultraviolet (U.V.) light source (i.e. wave length of about 3000–4000 A.). The previously exposed or light struck image areas 12a' as well as the previously unexposed or non-light-struck image area 12b' are thus both exposed to actinic light, but in the embodiment of the invention, the actinic light source 16 does not develop color in previously light struck image areas 12a'. The light source 16 may or may not develop color in the previously unexposed image area 12b', or as indicated at station C, the color in such previously unexposed image area 12b'' is more fully developed by heat 17. In the positive-working system here described, however, the color forming capacity of the initially exposed or light struck image areas 12a, 12a is apparently lost by the initial exposure to light from the source 15 (through the transparent portions of the transparency 14); and the subsequent blanket exposure to ultraviolet light 16 at station B, plus heating at station C merely results in developing of a white, or tint in the areas 12a'', whereas the image at 12b'' develops color.

The instant invention, however, involves substantially more than the foregoing positive-working photographic sequence and includes positive-working procedures wherein the second light source 16 is also of visible actinic light, but of greater intensity than the first light source 15, or which is the same exact light source 15, but blanket exposure of the layer 12' is of a longer duration than is the initial image-wise exposure of layer 12. Thus, the instant invention involves positive-working photographic procedures wherein the second, blanket, exposure is of a different wavelength-intensity-exposure or light than is the first, deactivating, image-wise exposure, which second exposure provides a shorter wavelength, higher intensity and/or longer exposure time than said first exposure.

This invention also involves negative-working procedures wherein an image-wise wavelength-intensity-exposure of light is used to establish a color or color-forming tendency in the light-struck areas. The background is then "fixed" against color formation by chemical means or by subsequent blanketing with a deactivating, non-color yielding, wavelength-intensity-exposure of light.

Broadly, photosensitive compositions of this invention are prepared by homogeneously dispersing at least two starting agents $(a)$ and $(b)$ in a dispersing medium $(c)$, in which $(a)$ and $(b$ are substantially insoluble, under appropriate time-temperature-agitation conditions and forming an emulsion containing a combination $(ab)$ in the form of fine discrete particles or globules. It is important that both $(a)$ and $(b)$ are, in the absence of a solvent, substantially insoluble in $(c)$ and that at least one of such starting agents be either molten or else be liquefied by a solvent. The term "molten" is used herein to signify materials which are liquid, regardless of whether or not such materials are liquid at room temperature or are liquefied by fusion or by heat, but does not signify liquefication by a solvent.

When no solvent is used and at least one of the starting agents is molten, dispersion can be accomplished by agitation such as is obtained by use of a Waring blender, a ball mill, or other shearing, grinding or otherwise "violent" stirring or dispersing means. When a solvent is used to liquefy at least one of the starting agents, suitable emulsions can be formed with only mild stirring, but smaller particle sizes are more readily obtained with more "violent" agitation as described.

Broadly then, one method of obtaining emulsions suitable for use in this invention comprises subjecting a photosensitive dispersion consisting essentially of (1) a photosensitive dispersed phase comprising at least two starting agents, at least one of which is molten, in a (2) dispersion medium formed of a solid-film-forming vehicle, in which said starting agents are substantially insoluble, to time-temperature-agitation conditions and effecting formation of discrete globules of a light-absorbing combination of at least two such starting agents, said combination being responsive to actinic light to yield an image of selective light absorptivity distinct from that of said combination and said starting agents. The emulsions are, of course, prepared in the substantial absence of actinic light. When a solvent is used, it is generally preferred to use only a small liquefying amount.

It is believed that the various aspects of the invention will be made apparent from consideration of an initial detailed example of a preferred embodiment of the invention, as follows:

EXAMPLE 1A

Run 1A.—A charge of $(a)$ 5 g. of N-vinylcarbazole (M.P. 65–67° C.), as a starting agent, $(x)$ 0.5 mg. of rhodamine dye, and $(c)$ 10 g. of gelatin in 36 ml. of water (preferably containing about 6 drops of a foam depressant "Dow-Corning Antifoam B" understood to be a dimethylpolysiloxane fluid), as a continuous phase, is violently agitated at high speed in a Waring Blendor, with heating up to a temperature of 70–72° C. primarily as a result of the dispersing effect of the blender over a period of 10–15 minutes, with such high speed agitation being continued at such temperature for a time (e.g., 2–3 minutes in this run) sufficient to obtain a substantially uniform "agent-in-water" emulsion (which time is preferably held to the minimum permitted to obtain a uniform emulsion). Once the dispersed agent is in the molten state, its fundamental characteristics such as particle size, etc. may be controlled within limits by selection of time-temperature-agitation conditions.

At this stage, the substantially uniform, somewhat "pinkish" emulsion is understood to comprise $(c)$ an aqueous-gelatin substantially-translucent-solid-film-forming vehicle, functioning as the continuous liquid phase, containing intimately dispersed therein a dispersed phase consisting essentially of $(a)$ dyed N-vinylcarbazole in molten form reduced by the viscosity differences between the phases and the violent agitation to substantially fine-sized, discrete, rounded, generally spheroidal (if not actually spherical) globules (i.e. liquefied dispersed particles) which are substantially insoluble in the continuous phase $(c)$.

Next, a charge of $(b)$ 1 g. of carbon tetrabromide (M.P. 92° C.), as a second starting agent, is added to the blendor with continued high speed agitation at the temperature of 70–72° C. until a substantially uniform emulsion is again obtained, which takes 1–2 minutes (which time is preferably held to the minimum permitted to obtain a uniform emulsion, and avoid excessive premature reaction between the dispersed phase agents).

At this stage, the emulsion is understood to comprise substantially the same continuous phase system $(c)$ with a different dispersed phase wherein the molten dyed N-vinylcarbazole $(a)$ has fused with the carbon tetrabromide $(b)$, which starting agents $(a)$ and $(b)$ are believed to be miscible under these conditions, to form a new dyed combination $(ab)$ that is in molten form reduced by the viscosity differences between the phases and the violent agitation to substantially fine-sized, discrete, rounded, generally spheroidal globules, which are substantially insoluble in the continuous phase $(c)$.

As soon as the substantially uniform emulsion of the previous paragraph is obtained, the emulsion is applied as a 3 mil (wet thickness) film (using the Bird coating bar drawdown technique) onto sheets of vellum paper. The dispersed phase combination $(ab)$ solidifies quickly in situ in the film-forming vehicle $(c)$ as the emulsion is cooled, to form substantially uniformly sized, discrete, substantially non-agglomerated, generally spheroidal solidified particles, having an average particle size or diameter of about 2–4 microns (within an approximate range of about 0.3 to about 10 microns).

The paper sheets with the wet film coatings thereon are placed in a dark room dryer at 25° C. for about 10 minutes, to obtain formation of a dry solid continuous phase $(c)$, i.e., that is dry to the touch, whereby a clear substantially transparent continuous phase film is obtained having a uniform mild pinkish background color, imparted thereto by the dyed dispersed phase combination (ab). This film is photosensitive and (with certain exceptions hereinafter noted) it should be kept until ready for use in the substantial absence of strong actinic light and the preparation thereof including the production of the emulsion itself hereinbefore described is, of course, carried out in the substantial absence of such actinic light. An advantage of the invention is that the extreme precautions ordinarily taken to protect against actinic light in silver photography need not be taken with this particular system.

The starting agent (a) and (b) are each separate and distinct light absorbers; each is substantially colorless as such (when dispersed or dissolved in a transparent inert carrier); and each is substantially insoluble in the continuous phase (c) (in molten or solid form). In contrast, (x) the dye sensitizer is also a separate and distinct light absorber; but it is reddish rather than colorless and in the dilute concentration here used it appears only as a mildly pink in the final emulsion and/or dried film. The co-fusion, co-liquefication and/or solution (and/or mutual plasticization) which takes place in situ in the continuous phase (c) between the starting agents (a) and (b) results in a very intimate, substantially homogeneous combination (ab) during such violent agitation and heating, and, during the overall time-temperature cycle here used, such dispersed phase combination (ab) ultimately solidified in situ in the continuous phase (c), in a system characteristic of an intrinsic colloid, evidenced in part by non-agglomeration of such solidified (or solidifying) particles, which highly desirable property is believed to be enhanced by such solidification in situ.

It will be appreciated that (x) the dye sensitizer does not interfere with the foregoing dispersion of the dispersed combination (ab) or its subsequent solidification in situ. The sensitizer (x) does, however, exhibit sufficient preference for the combination (ab) to apparently dye or color the same by adsorption thereon and/or solution therein, i.e. in any case involving physical molecular contact therewith, notwithstanding the fact that the dye may (and here does) also possess water-solubility. Although we have not yet ascertained definitely the exact nature of this physical contact, it seems clear that it is, in fact, physical rather than any sort of a chemical co-reaction which might alter the fundamental radiant energy absorptivity of the dye (x). The preference of this water soluble dye (x) for the combination (ab) can be readily demonstrated by prefusing the dye (x) with (a), by adding the dye (x) as previously described; and/or by adding the dye (x) with or even subsequent to the addition of (b). In the last procedure, however, care must still be taken to avoid premature heat reaction with the combination (ab), and it appears that the "molecular" attraction or physical preference is most effectively obtained by the first "prefusing" procedure in that this often results in darker more distinct images in the final product (notwithstanding the fact that the initial blending operation with molten (a) offers ample opportunity to completely leach the dye (x) out of (a) and into the continuous aqueous phase, if it were so disposed). At least with the rhodamines (x) there is a mysterious preference which is implemented by the pre-fusion steps. In any case, however, the addition of the dye (x) as previously described imparts a mild pinkish color (characteristic of small concentrations of rhodamine) to the emulsion and/or the resulting film; and, further, the fluorescence characteristic of certain rhodamine dyes (x) is apparently quenched in the instant combination (ab), at least in its photosensitive condition.

In most other respects, the combination (ab) does not appear at this stage to be altered; nor does it appear to alert the pinkish color characteristic of the dye (x), thereby indicating that the combination therebetween is essentially a close but molecularly physical relationship. It is fully appreciated that such molecular physical contact, attachment and/or preference for the dye (x) may involve substantial solution of the dye (x) within the combination (ab), direct adsorption of dye molecules in molecular thin layers on the dispersed phase combination (ab) particles or "grains," and/or either or both of these phenomena involving solvated dye molecules. It has been suggested in silver photography that water molecules (which are here present) link to polar dye groups to aggregate the same, but this only means that the molecular physical contact here involved may or may not involve "solvated" dye molecules (with or without molecular "bridges" of the solvent being involved). It has also been suggested in silver photography that gelatin functions to produce useful dye aggregation, but in the present situation it seems unlikely that gelatin is involved in the molecular physical contact of which we speak (whether via "bridges" or not) since comparable results in many respects may be obtained using starch rather than gelatin. Certain improved results using gelatin do not, however, appear to be fully explainable on the basis of simply better light transparency of gelatin systems.

In the absence of the dye (x), in preparing a "control" system, the dispersed solidified combination (ab) is understood to possess within the individual particles substantial homogeneity characteristic of the solid solution state, and although the existence of the academically true solid solution is very difficult to evaluate, as a practical matter these particles possess homogeneity such that they are here characterized as being solid solutions. The combination (ab) also is a separate and distinct light absorber, which in this particular case differs from the substantially colorless starting agents (a) and (b) in that it possesses a distinct but mild yellowish hue, thereby indicating blue light absorption. The change from the substantially colorless starting agents (a) and (b) to the colored combination (ab) in the practice of the invention demonstrates that this particular combination (ab) is more than a purely physical solid solution or similar type of combination; and it is, in fact, a chemical combination of at least a complex, if not a truly new chemical compound, which is evidenced by the color (i.e. yellow) formation. Moreover, it will be seen that this chemical combination is not merely premature photo-development or photo-chemical reaction, since this photo-sensitive dispersed phase combination (ab) is capable in response to sequential exposure to actinic light and heat of conversion in one instance to a less yellow image, and in another instance to a pronounced blue-green image, with each such images involving light absorptivity separate and distinct from each other, from that of the combination (ab) and from that of the individual starting agents (a) and (b).

The change in light absorptivity obtained in the yellow photosensitive "control" combination (ab) from that of either starting agent (a) or (b) does not; however, necessarily involve complete chemical change and/or complete loss of chemical identity of the starting agents (a) and (b) at this stage. In fact, the indication is that each particle of the combination has the characteristics of a solid solution of (a), (b) and the interaction product, i.e., the colored complex or chemical reaction product (ab) thereof, because of the apparent molecular intimacy of association of the components evidenced by their ready reactivity and high photosensitivity. For example, if heating of the uniform emulsion of the combination (ab) is continued for long periods at 70–72 C. or at higher temperatures further reaction is evidenced by additional color changes which under certain circumstances would indicate more interaction of starting agents (a) and (b). Certain characteristics of this continuing chemical type reaction during a given time-temperature cycle may be demonstrated by fusing agents (a) and (b) alone together under carefully controlled conditions and observing the visible color change, but fusion together in the instant emulsion system affords distinct advantages in control of this type of reaction (as evidenced by the color obtained), so that the desired superphotosensitivity can be obtained in the resulting emulsion film.

In this respect, it will be understood that the term "light absorptivity" (or the term "light absorber" of actinic light) is understood to involve a substantial or significant quantitative and qualitative absorber of actinic light (within the available wave length range of actinic light). Even if this combination (ab) were purely physical, e.g., in solid solution only, the different characteristic light absorptivity thereof can be (and in many such combinations of the invention probably is) the result merely of the creation of a physical system within the particle wherein a given particular light absorption characteristic (in quantity and/or quality) will dominate. In the instant Example 1A this is apparent visually, giving evidence of chemical reaction; but in other combinations of the invention not involving a visible change, the change in light absorptivity is usually measurable, even though it may not involve a visible color change.

The addition of the dye (x) does not as such appear to alter whatever co-reaction may occur, as described in the previous three paragraphs, between (a) and (b) to form the combination (ab). The physical presence and contact of the dye (x) does, however, result in a pinkish rather than yellowish overall color to the photosensitive dispersion, in liquid or solid film form.

It is logical to conclude that the co-reaction between (ab) and (x) is esentially physical, at least while these components remain in the photosensitive state, because the visible color for the combination (abx) is substantially the pinkish color which should predominate at this concentration of (x); and the radiant absorption energy spectra for the combination (abx) is substantially the composite spectra of (ab) plus (x), although it must be concluded that very careful analyses of the comparative absorption spectra will demonstrate a certain amount of shifting that cannot be explained this readily.

"Control" system of Run 1A

A sheet of vellum paper with the dried "control" emulsion film prepared exactly as hereinbefore described except that the dye (x) is omitted and applied thereto (as described in Run 1A) is then initially exposed (imagewise) for two seconds to a positive color transparency projection (4½ diameters), 300 w. Bell and Howell Headliner slide projector (which uses a tungsten lamp providing wave length in the range of 4000–7800 A.). Next the sheet is subjected to a second exposure for 15 seconds by actinic near ultraviolet light from a set of two 15 w. black light blue lamps (which provide predominantly 3000–4000 A.), which second exposure is a blanket exposure, followed by heating the film to about 70° C. for about 10 seconds to obtain a positive picture, which appears (on a white background) as blue or greenish-blue during such heating.

Although it is not desired to limit this aspect of the invention to any particular theory, it is believed that the initial image-wise exposure to actinic light effects a latent image formation, in which the exposed areas or light struck areas of the photosensitive combination (ab) are substantially deactivated in the sense that they will not produce color in the subsequent process; and it is believed that this "deactivation" is probably caused by initial photo-polymerization via the N-vinyl group. Such initial photo-polymerization may involve the formation of only the N-vinyl dimer or trimer, or only an irreversible "pre-disposition" to form such polymers (in the later blanket exposure to actinic light and/or heat); but is does not deactivate the color-forming capacity of the combination in the initially exposed or light struck image area. This color-forming capacity is not lost in the initially non-exposed or non-light struck image areas (which are not "light struck" during the initial exposure); and the subsequent blanket near ultraviolet light and heat exposure brings out a clear faithful positive image.

The foregoing demonstration of the positive-working mode of the control system functioning (as indicated in the system of FIGURE 1) in the absence of the rhodamine sensitizing dye (x) has now been studied further and it has been compared as a control run (1A) with systems sensitized with rhodamine 6G (Run 6G), rhodamine S (Run S) and rhodamine G (Run G); in each case using the rhodamine dye exactly as hereinbefore described. The purpose of the comparison was to ascertain the wave bands of sensitivity and the type of image (positive or negative) formed, and for this purpose the systems of FIGURES 2 and 3 were used.

As is indicated in FIGURES 2 and 3 the light sources 25 and 35 are essentially the same light sources hereinbefore described, but in each case they are effectively provided with a filter indicated diagrammatically at 26 and 36. Such "filter" is a Bausch and Lomb grating monochromator which is capable of being used for selective exposure or projection of actinic light at reasonably accurate wave length settings of 4,000, 4,500, 5,000, 5,500, 6,000 and 6,500 A. (in each case with an accuracy of approximately plus or minus perhaps 100 to 150 A.). Using this type of selective light exposure one is able to ascertain more precisely the exact wave length or the limited wave band to which the various photosensitive systems actually have a spectral response.

In carrying out the experiments which are to be described, it will be appreciated that both the negative-working and positive-working aspects of each system were considered.

Referring to the negative processing sequence of FIGURE 2 it will be seen that the light and "filter" combination 25–26 is used to project a given wave length of light, which we may assume, for example, to be approximately 4,000 A. The so-called image-projecting transparency 23 actually has light absorbing material thereon in the portions indicated in section and a light transmitting region 24, so that light from the system 25–26 is projected only onto a target area 22a on a photosensitive film being tested which is a film 22 on a paper back 21. Only the target area 22a is thus "light struck" and the non-target areas are non-light-struck areas 22b, 22b. It will thus be seen that in station E of FIGURE 2 elements corresponding to the elements previously described for stations A in FIGURE 1 are designated by the same reference numerals in the 20 series. At station E, however, the exposure time used is 1 minute and after such exposure the film 21 is then transferred to station F where it is subjected to moderate heat by a suitable heat source 28 such as a heated roll which roll is maintained at approximately 75° C. and if the exposure at station E were adequate, the image 22″a will then develop immediately in the light struck area and there will be no development of color or image in the non-light-struck areas 22″b, 22″b as indicated at station F of FIGURE 2. This demonstrates in a very simple form the negative-working aspect of the system. In an even more sensitive negative-working system, it will be appreciated that it is possible that the light alone would cause at least partial development of color in the target area 22a at station E, but the instant test was not run in this manner. Instead, the test was run by exposure of several different film samples 21, each of which had the same type of emulsion thereon but each of which was exposed to light of a different wave band (all as indicated subsequently in Table 1 hereof) and after 1 minute exposure to such wave band, the film was then immediately transferred to station F in the manner described in FIGURE 2 and heated in this manner to see if the system had received enough exposure in one minute to produce a negative image by virtue of the developement of color in the target area 22″a in the manner just described.

Referring briefly to FIGURE 3, it will be seen that four stations L, M, N and O are shown. For all intents and purposes the manipulative steps involved in stations L and M are substantially identical to the manipulative steps involved in stations E and F of FIGURE 2, except that no color develops in the so-called target area 32aa at station M in FIGURE 3. In other words the failure of the development of color in the target area 32aa indicates that the system has not received adequate exposure in one minute to produce a negative image under these particular conditions; and then the system is passed on through stations N and O. In station N it will be seen that the film 32′ is then given a blanket exposure to a near ultraviolet source 36 which is the same as the near ultraviolet source 16 previously described in connection with FIGURE 1; and then the film 32″ which has been subjected to the blanket U.V. exposure is moved to the next station O and subjected to heat, again using a heated roll at a temperature of about 75° C., which is indicated here diagrammatically at 38′, and it is then possible to determine what type of image is involved. If, as indicated in FIGURE 3, the original target area 32″a does not develop any color and the originally non-light-struck areas 32″b develop color with this heating at station O subsequent to the blanket U.V. exposure at station N, it will be appreciated that we have a positive image. If, on the other hand, there appears to be no selective color development in the film 32′ and there is no color change at all, it will be appreciated that the film 32″ has no photosensitivity at all, which will not be the case in the present instance. On the other hand, if the entire film 32″ develops a substantially uniform color in both the originally light-struck area 32″a and the originally non-light-struck areas 32″b, then we must conclude that the wave length of light or the wave band of light that was used in the system 35–36 for selective exposure of light to the target area 32a in the station L of FIGURE 3 is *not* a wave length or waveband of light to which the instant film 32 has any substantial spectral response. It has already been established by a number of tests that the mere combination of the specific ingredients (a) and (b) in the dispersed phase combination (ab) will give a photo or spectral response to the ultraviolet source 36a and unless there has been some change made in the spectral response of the overall film 32 by the selective exposure of the target area 32a to light of a predetermined selected wave band, the overall film 32′ at station M will not exhibit any selective response to the ultraviolet from the source 36 and the net result will be a "non-selective" response which will be indicated hereinafter in Table 1 and subsequent tables merely as "—." If, however, the system functions in the manner described hereinbefore in connection with FIGURE 2 and a negative image is obtained this will be indicated in Table 1 and subsequent tables by the abbreviation "neg."; and if the system functions in the manner just described in connection with FIGURE 3 so as to obtain a positive image with the result indicated diagrammatically at station O of FIGURE 3, the positive image will be referred to in the instant tables as "pos."

The following Table 1 demonstrates the results obtained using the various wave bands specified across the top of the table and using the control form as Run 1a (without any sensitizing dye) for comparison with corresponding films made using the various rhodamines as indicated in Runs 6G, S and G.

It will be seen that the control specimen exhibits negative-working properties in response to wave lengths of 4,000 and 4,500 A. and a positive-working response to the 5,000 A. wave length. It must be appreciated that all of the foregoing results are based upon an initial exposure at the wave length specified for 1 minute. It has now been found that if the initial exposure is extended for longer periods of time, particularly in instances involving a film which does have a spectral response to the wave length involved, then the system may change from a positive-working to a negative-working mode. This is not a contradiction to the original thinking expressed in our earlier applications. What this result means apparently is that the present combination (ab), if it is responsive to a given wave length, may be given a very brief exposure thereto and this results in some sort of phenomenon, which may well be the limited polymerization which we have previously suggested. As a consequence of this *brief* exposure, e.g., in the neighborhood of 5 to 10 seconds, the light struck area may then be pre-conditioned to such an extent that the subsequent exposure in the blanket ultraviolet exposure will effectively create an irreversible densensitization of the light-struck area and the light-struck area will no longer be capable of forming a color in response to the blanket U.V. exposure as well as the subsequent heating. On the other hand, it has now been found that if a system which so exhibits the positive-working phenomenon on the basis of a very brief initial exposure to a selected wave band is exposed for a substantially greater period of time to the same wave band, whatever the initial correction may be there is some sort of continuation thereof which leads through the initial so-called "desensitization" and into a highly sensitized condition, in which latter condition the system develops color quite easily and rapidly upon exposure merely to heat (without blanket U.V. exposure), and the system is then a negative-working system as indicated diagrammatically in FIGURE 2 hereof.

We are thus of the conclusion that, for example, the comparison between Run 1A (i.e. the control) and Run 6G using an initial exposure of 1 minute at the wave length of 5,000 A. demonstrates quite clearly that the sensitizing dye rhodamine 6G actually increases the photosensitivity of the system at this specific wave band and it effects a more rapid photosensitization thus carrying the system through the characteristic initial "insensitivity" to color-formation of positive-working mode and into the characteristic sensitivity to color-formation of negative-working mode. The different result at the wave band for 5,000 A. is thus apparent. Rhodamine 6G is thus a sensitizing dye which not only increases the overall range of spectral response (so as to include the wave band at 5,500 A.), but also increases the sensitivity clearly at both 5,000 and 5,500 A. Rhodamine S also demonstrates at least a definite increase in the range of spectral response, in that the range is extended up to 6,000 A. Rhodamine G also shows an altered spectral response not only in sensitivity but in range.

EXAMPLE 1B

Procedures are carried out that are identical in each case to the procedure of Example 1A, except that the following substitutions are made:

10 g. of cornstarch are substituted for the gelatin
90 g. of water are used
5 g. of N-vinyl carbazole is again used as agent (a)
The sensitizing dye and the amount of dye used is specified in Table 2 hereinafter in Runs 1 through 14
The amount of carbon tetrabromide used in 0.5 g.

The test employed for comparing the spectral response of the various films thus obtained is the same as that previously described which involves an initial 1 minute exposure to the wave band designated (which is designated in millimicrons instead of angstrom units in Table 2 here-

TABLE 1

| Wavelength | 4,000 | 4,500 | 5,000 | 5,500 | 6,000 | 6,500 |
|---|---|---|---|---|---|---|
| Run 1A | Neg. | Neg. | Pos. | | | |
| Run 6G | Neg. | Neg. | Neg. | Neg. | | |
| Run S | Neg. | Neg. | Pos. | Pos. | Pos. | |
| Run G | Neg. | Neg. | Neg. | Neg. | Neg. | | inafter) and this monochromator exposure of 1 minute is employed in each case, followed by the previously described heating briefly to about 75° C. to ascertain whether or not a negative image is produced, and then if no color is developed to indicate a negative image a blanket exposure to ultraviolet for approximately 10 seconds is employed and this in turn is followed again by heating to approximately 75° C. as indicated in the overall sequence of steps L through O of FIGURE 3 hereof in order to ascertain whether or not a positive image is produced. The results are set forth on Table 2 hereinafter.

of any decreases in photosensitivity during such storage. It is found that with longer storage the photosensitivity of this particular system tends to decrease; but this general effect is reduced by the use of the agents (d) in the manner just described. Although it is not desired to limit the invention to any particular theory in this respect, it is believed that there may be a slight tendency for the carbon tetrabromide (b) per se and/or in the combination (ab) to release reactive entities that might tend to cause premature polymerization of the N-vinyl agent (a) and/or desensitization of the combination (ab) and a conse-

TABLE 2

| Run No. | Dye | Amt. of dye, mg. | Monochromator exposure, 1 min. Wavelength setting (mμ) | | | | | |
|---|---|---|---|---|---|---|---|---|
| | | | 400 | 450 | 500 | 550 | 600 | 650 |
| 1 | Control | None | Neg. | Neg. | Pos. | | | |
| 2 | Pinacyanole | 0.12 | Neg. | Neg. | Pos. | Pos. | Pos. | Pos. |
| 3 | Rose bengal | 0.16 | Neg. | Pos. | | | | |
| 4 | Erythrosin | 0.21 | Neg. | Pos. | Pos. | | | |
| 5 | Methylene blue | 0.10 | Neg. | Neg. | Pos. | | Pos. | Pos. |
| 6 | Thionin | 0.15 | Neg. | Pos. | Pos. | Pos. | Pos. | Pos. |
| 7 | Ethyl red | 0.81 | Neg. | Pos. | Neg. | | | |
| 8 | Pinaflavol | 0.50 | Neg. | Pos. | Pos. | | | |
| 9 | Rhodamine B | .42 | Neg. | Pos. | Pos. | Pos. | Pos. | |
| 10 | Eosin Y | 0.8 | Neg. | Neg. | Pos. | Pos. | | |
| 11 | Victoria blue | 0.71 | Neg. | Neg. | | | | |
| 12 | Malachite green oxalate | 0.8 | Neg. | Pos. | Pos. | | Pos. | Pos. |
| 13 | Crystal violet | 0.34 | Neg. | Pos. | Pos. | Pos. | Pos. | Pos. |
| 14 | Orthochrome T | 0.72 | Neg. | Pos. | | | | |
| 15 | do | 1.3 | Neg. | Neg. | Neg. | Neg. | Neg. | Neg. |

In order to evaluate storage stability of the films of the invention, the foregoing procedure of Run 1A (but including rhodamine 6G) was repeated in subsequent runs numbered as indicated in Table 3 hereinafter, but using the additives to the Run 1A formulation hereinbefore specified, as set forth in Table 3. It will be appreciated that the additives specified in Table 3 are added to the emulsion at substantially the same time that agent (b) is added, primarily for the purpose of using uniform conditions for comparison. The additives employed are agents (d) selected generally from the class consisting of "alkaline reacting" amine, phenol and amide additives compatible with the hereinbefore described combination (ab). Such compatibility involves a substantial loss of identity of the agent (d) in the instant emulsion, presumably by physical and/or chemical combination of such ingredients in the dispersed phase to obtain the uniformity or homogeneity characteristic thereof.

TABLE 3

Run No.: Additives (d) to Run 1A Formulation
1B ---------- Formamide, ½ ml. hexamethylenetetramine, 0.10 g.
1C ---------- Dimethylformamide, ⅓ ml. hexamethylenetetramine, 0.10 g.
1D ---------- Acetamide, .024 g. hexamethylenetetramine, 0.10 g.
1E ---------- Toluhydroquinone, .025 g. hexamethylenetetramine, 0.10 g.
1F ---------- Mono-tertiarybutylhydroquinone, .025 g. hexamethylenetetramine, 0.10 g.
1G ---------- 2.5-ditertiarybutylhydroquinone, .026 g. hexamethylenetetramine, 0.10 g.
1H ---------- Hydroquinone, .027 g. hexamethylenetetramine, 0.10 g.
1J ---------- Hydroquinone monomethyl ether, .024 g. hexamethylenetetramine, 0.10 g.

The paper sheets coated with the dried films obtained from Runs 1A through 1J are stored for different periods of time in a dark room, under substantially uniform conditions in order to obtain indications of shelf life of the photosensitive coating. After such varying storage times, certain photosensitive sheets were exposed in the positive-working sequence hereinbefore described for Run 1A, with variations in the initial exposure time from 0.4 second to 20 seconds in order to make comparisons as to photosensitivity and determinations as to the nature and extent quent loss of photosensitization in the film; and the instant alkaline additive agents (d) are believed to stabilize this system. In particular, it is found that hexamethylene tetramine gives superior results in this respect. Essentially non-volatile amines are thus useful in this particular function. The phenols are also useful to give improved storage and shelf life, particularly when used in the systems described on Table 3 hereof. In general, the amides per se appear to be less effective.

In summary, then, it will be seen that using a preferred combination (ab) and including the sensitizing dye (x) rhodamine 6G of the invention involving a starting agent (b) which is an organic halogen compound that may effect release of a reactive entity or group (whatever the theoretical considerations involved), it is advantageous in the practice of the invention to improve shelf-life of the instant photosensitive compositions and/or films by inclusion in such combination (ab) of a stabilizing agent ($d_1$) in small amounts, ranging in the weight ratio of ($d_1$):(b) from a minimum practical amount of about 1:1000 to a maximum practical amount of about 1:2, such that whatever nominal amount of reactive groups might tend to be released during storage may be at least temporarily maintained substantially ineffective with respect to interference with the photosensitivity of the combination (ab); but whatever reactivity that is involved in the desired photo-reaction of such combination (ab) will not be adversely affected. Such stabilizing agent ($d_1$) if found to be preferably an alkaline-reacting amine (e.g., hexamethylenetetramine) or amide which is substantially non-volatile under normal (room temperature) storage conditions. In the foregoing Runs 1B through 1J it will be found that the amine component alone is effective.

It will also be seen that using a preferred combination (ab) of the invention involving a starting agent (a) which is capable of addition polymerization, it is apparently advantageous to improve shelf-life of the instant photosensitive compositions and/or films by inclusion in such combination (ab) of a stabilizing agent ($d_2$) in small amounts, ranging in the weight ratio of ($d_2$):(a) from a minimum practical amount of about 1:1000 to a maximum practical amount of about 1:2, such that whatever nominal amount of polymerization might tend to take place during storage may be at least temporarily inhibited; but whatever desired photo-polymerization that may be required at the time of exposure to actinic light will not be adversely affected. Such polymerization inhibitor type of stabilizing agent ($d_2$) is found to be preferably a non-volatile, normally solid phenol and/or amine. As indicated in Runs 1B through 1J, such agents ($d_1$) and ($d_2$) may be used as a combination stabilizing agent ($d$), again in weight ratios of ($d$):($ab$) ranging from 1:2 to 1:1000; such agents ($d_1$) or ($d_2$) may be used alone to advantage; and/or stabilizing agents having both of the functions described may be used effectively, as an individual agent ($d$), e.g. morpholine.

As noted, the photosensitive combination comprises at least two starting agents, ($a$) and ($b$) one of which ($b$) is an organic halogen compound. In general it is preferred that the organic halogen compound be selected from the group of compounds which produce free radicals or ions upon exposure to light of a suitable wave length and in which there is present at least one active halogen selected from the group consisting of chlorine, bromine and iodine, attached to a carbon atom having not more than one hydrogen atom attached thereto. Compounds of this preferred group are described in U.S. Patents Nos. 3,042,515, 3,042,516 and 3,042,517, as well as in our prior applications referred to above, particularly Ser. No. 481,759, and the descriptions and disclosures contained therein are hereby incorporated by reference. Examples of suitable organic halogen compounds include carbon tetrabromide, tribromochloromethane, dibromodichloromethane, pentabromoethane, hexachloroethane, hexabromoethane, bromotrichloromethane, bromoform, iodoform, 1,2,3,4-tetrabromobutane, tribromoacetic acid, 2,2,2-tribromoethanol, tetrachlorotetrahydronaphthalene, 1,1,1-tribromo-2-methyl-2-propanol, carbon tetrachloride, p-dichlorobenzene, 4-bromobiphenyl, 1-chloro-4-nitrobenzene, p-bromoacetanilide, 2,4-dichlorophenol, 1,2,3,4-tetrachlorobenzene, 1,2,3,5-tetrachlorobenzene, brominated polystyrene, n-chlorosuccinimide, n-bromosuccinimide, 2-chloroanthraquinone, tetrabromophenolphthalein, tetrabromo-o-cresol, and the like. A particularly preferred group of halogen compounds will be described further below.

It is also preferred that the other starting agent, ($a$), is a nitrogen atom-containing compound having certain structural characteristics. Thus it is preferred that the nitrogen atom-containing compound have a nitrogen atom attached directly to at least one benzene ring, said benzene ring being free from carbon atom substitution in the position para to said nitrogen atom attachment. Another type of preferred nitrogen atom-containing compound is one in which the nitrogen atom is a member of a heterocyclic ring. Still another type of preferred nitrogen atom-containing compound is an N-vinyl compound. It will be appreciated that there is substantial overlap between the above types of nitrogen atom-containing compounds and that preferred compounds can fall within one, two or even all three of the above terms; e.g., N-vinylcarbazole. It will also be appreciated that there is no generic term available in accepted chemical terminology that will effectively accomplish all of the above types of nitrogen atom-containing compounds. It is merely important to note that photosensitive combinations containing a compound which has at least one of the above characteristics are preferred in this invention. Photosensitive combinations containing compounds having more than one of the above characteristics lend themselves even better to this invention. Examples of particularly effective nitrogen atom-containing compounds include N-vinylcarbazole, N-ethylcarbazole, indole and diphenylamine. Preferred nitrogen atom-containing compounds are described in our prior applications referred to above, particularly Ser. No. 481,759, and the descriptions and disclosures contained therein are hereby incorporated by reference.

The combinations ($ab$) are dispersed in the form of discrete globules in a continuous phase in which the combination is substantially insoluble. Such dispersions are discussed in our above-noted applications, particularly Ser. No. 481,759. Generally, the solid-film-forming component used to achieve a continuous phase may be any of a number of generally photographically inert materials, which are, in most cases, soluble in water or so finely dispersible therein in the concentrations of use that for practical purposes there is no distinction between solution and dispersion for these materials in the continuous phase. Such materials include the starch and starch derivatives, proteins (i.e., casein, zein, gelatin, thiolated gelatin, etc.), alginates, gums, and the like materials which are generally considered to be natural derivatives of natural film-forming materials, any one of which in its conventional "water-soluble" form is used in the practice of the instant invention. In addition, synthetic water-soluble film-formers may also be used to particular advantage in the practice of the invention and such materials include polyvinyl alcohol, commercially available water-soluble polyacrylics or acrylates (i.e., water-soluble polyacrylic acid salts having substantially the molecular weight and water compatibility of the polyvinyl alcohol), various commercially available amine or amine-aldehyde resins, etc. Also, a number of cellulose derivative film-formers may be used, and these include the various water-soluble cellulose ethers, carboxymethylcellulose, hydroxypropylmethylcellulose, etc. Essentially these materials are photo-insensitive and their principal function is that of forming the desired film which will retain the dispersed phase in discrete particle form. Of the above materials, gelatin, casein, polyvinyl alcohol, gum arabic, starch, alkali metal carboxymethylcellulose (e.g., sodium carboxymethylcellulose) and hydroxyethylcellulose are particularly useful in this invention.

It has been brought out in this invention that compounds ($a$) and ($b$) should be dispersed together in a photosensitive coating as fine discrete particles rather than in molecular or near molecular form. The proximity of the reactants, due to the high reactant concentration in the particulate structure, is believed to be the reason for the great sensitivity of the particulate system.

In Example 1A, compound ($a$), N-vinylcarbazole in that case, is violently agitated in the dispersion medium ($c$), e.g., aqueous gelatin solution, which is at a temperature above the melting point of compound ($a$). Since compound ($a$) is in the molten state, agitation produces an emulsion, i.e., a liquid-in-liquid dispersion. Compound ($b$), $CBr_4$ in that case, is added to the emulsion with continued agitation, and the resultant emulsion is applied to a sheet support. Upon cooling and drying, a photosensitive coating is obtained in which fine discrete ($ab$) particles are dispersed in a solid dispersion medium ($c$).

It is also possible, and it is preferable, to obtain an emulsion by a process in which compound ($a$), instead of being melted, is first dissolved in an organic solvent, e.g., acetone, to liquefy the same, and the solution is then emulsified in an aqueous solution of gelatin or some other water-soluble binder. Compound ($b$) may be in the same organic solvent solution with compound ($a$) so that both reactants are dispersed together, or compound ($b$) may be added later, in a separate solution, to an already formed emulsion with the dispersed phase ($c$) containing compound ($a$). Emulsions prepared by this solution process, when applied to a sheet support and dried, give the same type of photosensitive coatings obtained by the previously disclosed molten compound ($a$) process.

Compounds ($a$) and ($b$) form an intimate combination ($ab$) as the solvent is lost from the dispersed phase. Because lower temperatures are used in such emulsion preparation, premature reaction between the reactants and the loss of reactant(s) by volatilization are minimized. Also, the choice of compound ($a$) is not limited to those compounds which melt below the boiling point of the dispersion medium. Furthermore, batch preparations of photosensitive emulsions are more easily handled by the solution process.

Another advantage in using a solvent is that the amount of agitation needed to disperse the compounds, when so liquefied, can be substantially reduced. Thus, the use of even simple stirring will generally suffice to yield a useful emulsion. However, particle sizes are generally larger when agitation is curtailed, and therefore the grain size of the resultant film is larger. Accordingly, even when a solvent is used, it is preferred to use "violent" agitation such as has been described. In this way, emulsions containing very fine particles, e.g., 0.3–10.0 microns, can be readily obtained.

While an organic solvent is used in putting the compounds into dispersion, the whole system is essentially an aqueous system. The amount of organic solvent used is relatively small. Further details of these procedures and examples of solvents that can be used can be found in our prior applications as above noted.

Theory of the invention

Although it is not desired to limit the invention to any particular theory, it is believed that there are certain parallel aspects between the mechanism of so-called "optical sensitization" in silver photography and that involved in the present system or systems. For example, in silver photography the silver halide is present in a predetermined dispersed phase or so-called "grain" structure and size in usually a gelatin film-forming medium that involves a different, continuous, translucent phase; and in the present system the photosensitive phase is, likewise, dispersed in a substantially translucent-solid-film-forming vehicle or the solid film resulting therefrom. As in silver photography, the dyeing of the continuous phase only in the present system causes the dye to act essentially as a filter rather than a dye sensitizer, since the dye that may be functionally present in the continuous phase is capable only of selective absorption of light and presumably conversion of the energy thus absorbed to heat or some other form of energy which is dissipated. In contrast, in silver photography, the dye sensitization requires not only the absorption of the radiant energy by the dye but a certain type of physical or molecular contact between the sensitizing dye molecule and the photosensitive molecular structure, whereby absorbed energy is transferred directly to the photosensitive molecules per se to impart energy thereto which is functionally equivalent to radiant energy which these photosensitive molecules might be able to absorb per se. It is also understood that such physical molecular contact between the sensitizing dye and the photosensitive dispersed phase, as in the case of silver halides, may permit or require the effective use of a dye sensitizing molecular structure which involves or contemplates such known molecular (or complex) structural concepts as solvation, etc. wherein a supposedly inert "bridging" structure of water of hydration, solvation, etc. may be involved in or be a part of the molecular contact between the sensitizing dye and the silver halide.

In fact, such is often the case in silver photography wherein exhaustive studies indicate that the sensitizing dye tends primarily to be initially adsorbed on the surface of the silver grains which in turn contain from $10^{11}$ up to $10^{17}$ molecules of silver halide per grain. The grain is thus said to be dyed. In silver photography it is recognized that a photon of energy absorbed by an adsorbed dye "molecule" may transfer substantially the same amount of energy to the silver halide grain (and no case has been known where such dye has transferred more energy) with resultant formation of a "light-struck" grain of silver halide (which is ultimately capable during development of "touching off" a chain reaction of silver reduction indicating a fantastic quantum yield in the neighborhood of $10^6$ in silver photography).

Although there are certain parallel concepts here involved, it must be appreciated that there are certain peculiar characteristics to the instant "dry" photographic process which do not make the discovery of the use of dye sensitization therewith obvious or, even in many cases, logical. It is conceded that in certain cases the prior art workers have made general reference to the general concept of dye sensitization in connection with physical systems differing basically from the present physical system, in that the individual agents which were allegedly expected to coreact to form a color were employed in either liquid or solid solution, or at least films resulting from the deposition of liquid solutions of such agents in the presence of solvent media of substantial quantity. In such situations, if a color reaction were to function, it would presumably take place as a result of the release of some sort of free radical in this state of solution and the free radical would be released in such a manner that it could reach out or in some way travel to some other agent or chemical entity in this solution system and thereby effect color formation. It is, likewise, logical to assume that if a photosensitizing dye were present in such a system, the photosensitizing dye (being itself a molecule) would either be in solution or adsorbed on some molecule or complex in the solution of such systems. We can thus assume that whatever dye sensitization that may have been suggested by the prior workers in the art in connection with any of the various combinations of agents ($a$) and ($b$) here involved, must have been involved in a system which was fundamentally different in character. This system involved overall solution of the various ingredients ($a$), ($b$) and/or the photosensitizing dye ($x$), plus a solvent ($y$) which could in and of itself afford molecular attraction between the sensitizing dye ($x$) and the molecules of the solvent ($y$). It will be appreciated that conjecture along these lines could be endless and it does not appear that there is any teaching in the prior art which would put an end to such conjecture.

In the fundamental theory of the practice of the instant invention, however, it must be appreciated that certain basic types of thinking are required:

(1) First of all we must define a dye, which in many cases can be done best by a negative type of definition which excludes the things which are not dyes. The previously mentioned publication by Brooker and Vittum is not all-inclusive but it does generally indicate the nature of dyes. Rather primitive distinctions between pigments and dyes suggesting that the dye is a material that is used in solution whereas the pigment is used in suspension are inadequate for purposes of the instant invention. The instant dye, in its photosensitizing capacity, may or may not be in solution. It is known that most of the dyes here employed are soluble in both the continuous and the dispersed phases and/or the agents ($a$) or ($b$) of the dispersed phases, when the same are in liquid form, but such knowledge only leads one to conclude that the instant photosensitizing dyes are particularly suitable for the typical adsorption function characteristic of silver halide sensitizing dyes in that the dyes show a preference for the dispersed silver halide grains and are thus adsorbed on the surface thereof, when one speaks of the silver halide grains as being "dyed." From the point of view of molecular structure dyes are generally considered to be chemical compounds which have selective light absorptivity, and in dyes the selective light absorptivity is based upon certain peculiarities of the molecular structure thereof. To the extent that this may be true also in pigments, it would be appreciated that a pigment might be used in the practice of the instant invention if it were capable of the transfer of radiant energy by virtue of the required close physical, molecular association between the so-called combination to be photosensitized and the pigment. In general, however, pigments are considered to be materials of substantial physical mass (quite often inorganic) wherein there are internal crystal lattice defects or irregularities of some sort which effect the selective light absorptivity within the body of the crystal and the energy thus selectively absorbed is dissipated as heat. In a photosensitizing dye the energy is presumably absorbed at a selected molecular structural area which is sufficiently exposed to be in so-called "molecular physical contact" with the photosensitive material to be sensitized, at least to the extent that it may effect a transfer of radiant energy absorbed, as contrasted merely to conversion of absorbed radiant energy to heat.

(2) It should further be pointed out that a dye is generally considered to be a molecule rather than a substantial body of matter, even though such molecule may be solvated, hydrated, etc. so as to be a complex rather than a theoretically definable molecule of definite structure. Because of the very nature of dyes the definition of the structure is complicated by the fact that there is presumably resonance within the molecule (which is a fundamental characteristic of the selective absorption of the dye). In general, however, the dye molecule itself is understood to comprise ring structures of benzenoid character as well as heterocyclic character linked and/or fused together so as to provide the essential bases for the bond resonance characteristic thereof. It will be appreciated that, if in the present system the photosensitizing dye is actually dissolved in the body of the dispersed phase, the dispersed phase is sufficiently translucent to afford the function with which we are here concerned, so the photosensitizing dye is still functioning essentially as a molecule which is capable of the selective absorption of light. If the dye is only adsorbed on the surface of the dispersed phase combinations of agents, it will still function in its capacity as a molecule. We have already pointed out that the likelihood that substantial amounts of the dye would be functional while dissolved in the solid solution or liquid form of the continuous phase is not to be expected, because in this capacity the dye would be more or less isolated from the dispersed phases and could function to absorb light but not to transfer the radiant energy in the manner hereinafter described and the manner which is necessarily involved herein, so in this latter capacity the dye would function primarily only as a light filter. In such instances wherein an excessive amount of dye is used, however, it must be appreciated that the spectral response of the overall system may be altered for the reason that it would be diminished. Thus if the dye were capable of absorbing a wave band to which the combination had peculiar spectral response or sensitivity, an excessive amount of the dye used herein, to such an extent that it would be present in the dissolved or separately dispersed condition within the continuous phase would result in a diminution of the nature of the spectral response of the combination, but not necessarily a complete elimination thereof. In fact, in certain instances it may be highly desirable to employ a photosensitizing dye solely for the purpose of rendering the present photosensitive system non-responsive to certain wavelengths or wave bands, such that the spectral response would be altered but the range of spectral response would be perhaps decreased or the sensitivity in a given range would be decreased. The photosensitizing dyes used in the practice of the instant invention contemplate selective absorptivity over the practical range of radiant energy from the minimum wavelength of about 3500 A. which the photographic lenses will transmit up to and including the entire visible range and at least the infrared range included within the overall spectrum of the sun, which for practical purposes would extend up to about 10,000 angstroms. Of course, reference to a photosensitizing dye as a visible photosensitizing dye would mean that it has selective absorptivity within the visible range and thus imparts to the observer the appearance of color of one sort or another.

(3) Still another particularly important aspect of the instant photosensitizing dye used in the practice of the instant invention is that it is essentially chemically inert to the continuous phase and the agents individually or in combination in the dispersed phase under the normal conditions of preparation of the compositions of the invention, i.e., under ordinary conditions of ambient operating pressure and atmospheres, including moisture, carbon dioxide and comparable ingredients characteristically present in the air, and under the general conditions of preparation of the compositions of the invention with respect to the exclusion of drastic temperatures or excessive amounts of actinic light. In general, the temperature ranges employed may range from a practical minimum of about room temperature (i.e. about 20° C.) up to a practical maximum at which some liquefication of at least one of the agents employed in the dispersed phase may be accomplished, without substantial desensitizing reaction among the various ingredients, which temperature may range from 50 to 100° C. depending upon the particular materials used. It is elementary that the photosensitizing dye is inert under these conditions and does not undergo chemical reaction with the ingredients present.

(4) It is also elementary, however, as a part of the concept of photosensitization that the photosensitizing dye have some basic characteristics with respect to light absorption that differ fundamentally from those of the other materials present. Thus, in general, the sensitizing dye is a separate and distinct chemical from any of the agents herein described for use in any given combination and it is separate and distinct from the continuous phase, and, although it has a preferential physical attraction for the combination of the aforesaid agents it is not generally chemically reactive therewith (at least in the absence of color forming exposure to actinic light). Moreover, the dye has its own separate and distinct light absorptivity, which distinguishes it from the continuous phase components, each of the agents used in the particular combination and the combination of agents ultimately obtained in the dispersed phase.

(5) Still more important, the photosensitive dye has the preferential physical attraction in a molecular sense for the instant combination, i.e., it effectively "dyes" the dispersed phase combination, in such a manner that the light selectively absorbed by the photosensitizing dye is actually transferred as energy to the known photosensitive combination. As indicated, the photosensitive combination itself is known to be photosensitive, but its spectral response has certain limitations not only in sensitivity or speed but also in range of spectral response. The photosensitive dye thus molecularly attracted to and physically engaged with the instant dispersed phase combination effects a different spectral response in this combination. This is done, for example, by exposure of the photosensitive system to actinic light to which the combination would be sensitive in the absence of the photosensitive dye, plus actinic light which is absorbed by the dye sensitizer, so that the total amount of actinic energy causing the photosensitive reaction to take place will thus be cumulative in nature in that it will include not only the normally absorbed actinic light of the combination but also the not-normally absorbed actinic light which the dye sensitizer actually absorbs and then transmits to the photosensitive combination. In other situations the actinic light source will be such that it will contain no wave bands which would normally find spectral response in the undyed combination; and in such situations the sensitizing dye will be the sole absorber of actinic energy and the actinic energy which it absorbs selectively as a photosensitizing dye will then be transferred immediately to the intimate molecular association which the dye has with the combination and the spectral response of the combination will then take place as if it had been activated by actinic light to which it was actually initially responsive, in the absence of such sensitizing dye.

(6) One characteristic of organic halogen compounds (b) of the invention which is indicative of ability to function effectively in dye sensitization, particularly for purposes of broadening the spectral range of response, involves the presence of Br—C in the molecule such that this bond is believed to be responsive to actinic light in the dye sensitized systems hereof. In such instances the C is attached to at least two other halide atoms and preferably in instances wherein the fourth C bond is satisfied by another C atom then such two other halide atoms are preferably Br. Hence the compound (b) in one instance preferably has the formula Br—$CX_3$ wherein each X is preferably a halogen atom, with better results being obtained using Br—$CX_3$ wherein at least two and preferably all four substituents on C are Br i.e., with $CBr_4$ and $CBr_2Cl_2$ which both perform well, whereas $CBrCl_3$ is functional but less effective. Repeating the tests of Examples 1A and 1B with $CBr_2Cl_2$ one obtains results comparable to those already described; whereas replacement of $CBr_4$ in such tests results in photosensitization along the lines indicated, but less emphatically. Also, less emphatic in dye sensitization behavior are compounds having the formula: $Br_3C$—$CY_3$ wherein Y may be halogen, hydrogen, hydroxy, methyl and/or methylol groups (as in the case of $Br_3C$—$CBr_2H$, $Br_3C$—$CH_2OH$, $Br_3CC(CH_3)_2OH$, etc., each of which is functional. Each of these last mentioned compounds may replace the corresponding amount of $CBr_4$ in the previous runs and will thus exhibit increases in range of spectral response. One way of predetermining functionality is by testing with rhodamine, since the particularly effective compounds (b) with rhodamine a preferred sensitizer will quench the fluorescence characteristics thereof. Thus in a particular embodiment of this invention, it is particularly preferred to use organic halogen compounds (b) which have the formula

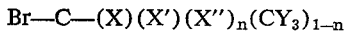

where X, X′ and X″ are halogens, each Y is independently selected from the group consisting of halogen, hydrogen, hydroxy, methyl and methylol, and "n" is selected from 0 and 1, such that when "n" is 0, X and X′ are Br. This narrower class of compounds is particularly effective in combination with styryl dyes or dye bases such as 4-(p-dimethylaminostyryl)-quinoline dye or dye base. Examples of such compounds include carbon tetrabromide, bromotrichloromethane, dibromodichloromethane, pentabromoethane, 2,2,2-tribromoethane and 1,1,1-tribromo-2-methyl-2-propanol.

(7) Still another characteristic of the invention involves certain preferences for the nitrogen compounds (a), as noted above. N-vinylcarbazole is still most preferred and the theory relating to the performance thereof has been discussed in detail in our aforesaid applications and in the theoretical considerations hereof. Likewise, previously indicated preferred N-compounds of the classes of which N-ethyl carbazole and indole are typical are also preferred herein. In the foregoing examples the N-vinylcarbazole may be replaced with such other preferred compounds, e.g., indole and N-ethylcarbazole and corresponding but less emphatic extensions of the range of spectral response (e.g., for negative-working systems) are obtained.

Typical comparable results using various combinations (a) are obtained by repeating the procedure of Example 1B, as follows:

Using for compound (b) 2.5 g. of pentabromoethane, with and without (control) 0.12 mg. of (x) rhodamine B, the control exhibits the following results: 4,000 A.—"neg.," 4,500 A.—"pos."; whereas the increase in range of spectral response effected by the dye (x) is exhibited by the following results: 4,000 A.—"neg.," 4,500 A.—"pos.," 5,000 A.—"pos.," 5,500 A.—"neg.," and 6,000 A.—"neg." All of the aforesaid results are obtained using initial monochromator exposure times of 5 minutes and dark colored images are obtained.

Using the compound (a) in Example 1B diphenylamine in place of N-vinylcarbazole, one obtains in the control run typical results: 4,000 A.—"Neg." and 4,500 A.—"neg." Although the image color is more pronounced, one obtains otherwise substantially the same results by adding typically preferred dye sensitizers (x) rhodamine B (1 mg.) and/or Pinacyanole (1 mg.).

Using again a 5 minute monochromator exposure, distinct increases in range of spectral response are exhibited by comparing the control procedure of Example 1B using 2.5 g. of N-ethylcarbazole in place of the N-vinylcarbazole (which results in "neg." results only at lower wave lengths of 4,000 and 4,500 A.) with the same procedure using 0.91 mg. of rhodamine B (i.e., "neg." for 4,000, 4,500, 5,000 and 5,500 A.) or using 0.44 mg. of Pinacyanole which is most effective (i.e., "neg." results for 4,000, 4,500, 5,000, 5,500, 6,000, and 6,500 A.).

(8) Finally, certain preferences for dye sensitizers (x) have been discovered. In general the amount of (x) expressed in a weight ratio of (x):(b) should be quite small, i.e., 0.00005 to 0.015 or about 0.05 to 15 mg. per gram of halogen compound (b), or about 0.00001 to about 0.003 part by weight of the dispersed phase, in order to have best function of the dye as a sensitizer rather than have it function more as a filter using substantially larger amounts.

The functionality of all of the sensitizing dyes of the Brooker publication is not questioned. All of these dyes tend to absorb actinic energy (particularly in wavelengths outside the conventional spectral range for silver compounds which overlaps to a considerable extent the responsive spectral range for control (ab) combinations thereof) and all have exhibited their ability to transmit the absorbed energy via physical molecular contact or engagement to other molecules receptive of actinic energy for purposes of photoresponse. There is really no logical reason why the entirely different photoresponsive combination (ab) hereof should or could receive energy from dye sensitizers which sensitize silver systems; but this is apparently the case, even though preferred dyes (x) may differ for the different systems.

In the practice of the invention, ($x_1$) rhodamines (i.e., aminophthaleins) are apparently unusually effective. Such rhodamines as B, G, 6G, S, etc., which have the characteristic rhodamine ring structure and nominal substitution at the amino N's (i.e., H and/or $C_1$–$C_4$ alkyl) are unique in their ability to dye the dispersed phase combination (ab); impart photoresponse over a substantial visible light range, and effect a distinctly darker (than control) color to the image.

Typical of another preferred group ($x_2$) is pinacyanole and related carbocyanine or cyanine type dyes which have simple (unsubstituted) carbon chains interconnecting fused heterocyclic and benzenoid ring structures. Again, concentrations, pH, solubility, etc., are important factors in obtaining the desired "physical" system (abx). Examples include pinaflovol, Ethyl Red, quinaldine red, neocyanine, and the like.

Still another prefered class ($x_3$) is the Eosin group, Eosin A, S, BNY, etc., and Erythrosins characterized by heter-O-containing rings fused with benzenoid rings are found effective.

The triphenylmethane dye group ($x_4$) does not have heterocyclic ring structures (characteristic of many dye molecules) but the members thereof exhibit limited photosensitizing effect in some instances and conspicuous effectiveness in other cases, e.g., Crystal violet (Table 2 hereof) as contrasted to victoria blue which effects a decreased range of spectral response (under the particular conditions here reported). Malachite green (Table 2 hereof) also exhibits distinct extension of the range of spectral response.

Methylene blue and thionin are typical of still another sensitizing dye group ($x_5$), the thiazines, which are demonstrably useful (Table2).

Still other dye types include ($x_6$) the anthraquinonoid dyes, such as alizarin, and ($x_7$) the acridine dyes such as acridine orange.

We have found that, generally, the classes of styryl ($x_8$) (which is meant to include azastyryl), cyanine and rhodamine dyes and dye bases are more effective materials than others mentioned above. Most particularly preferred, as being generally the most effective, particularly with the class of halogen compounds of the formula Br—C(X)(X')(X'')$_n$(CY$_3$)$_{1-n}$ as defined above, are the styryl dyes, such as 4-(p-dimethylaminostyryl)quinoline dye or dye base.

Particularly effective dyes include:

2-(2-aza-p-dimethylaminostyryl)-benzothiazole,
2-(p-dimethylaminostyryl)-3,3-dimethylindole,
2-(p-dimethylaminostyryl)-benzothiazole,
2-(p-dimethylaminostyryl)-quinoline,
2-(2-aza-p-dimethylaminostyryl)-benzimidazole,
2-(2-aza-p-dimethylaminostyryl-thiazole,
4-(p-dimethylaminostyryl)-quinoline,
2-(p-dimethylaminostyryl)-benzimidazole,
2-3-(3-ethyl-2(3)-benzothiazolylidene)-propenyl-quinoline and 2-(p-dimethylaminostyryl)-pyridine, and the dye bases of each of the above.

Each of the above dyes and dye types can be used in their dye form or in their dye base form and reference to a "dye" is meant to include "dye bases" as well. This is in sharp contrast to previous uses where many of the above compounds were used for their color-forming properties rather than their sensitizing properties. Of course, in particular applications the dye base may be preferred over the dye, or vice versa, notably where the color of a particular form will mask the appearance of the product. Generally, however, the amount of dye used is small enough for any masking tendency to be inconsequential.

The following example illustrates the use of such dyes and bases. The following coating formulation was prepared and applied on velium:

Gelatin—10 g.
Water—36 ml.
N-vinylcarbazole—2.5 g.
Carbon tetrabromide—0.75 g.
4-(p-dimethylaminostyryl)-quinoline—2 mg.
Dow Corning Antifoam D—6 drops
Triton X-100—2 drops Formalin—1 drop A coated sheet was exposed to a projected image of a microfilm negative in a 300 w. Bell & and Howell Headliner Projector (8-diameter enlargement) for 30 seconds and the image was developed with heat. A positive image was obtained. When the developed sheet was brought out into room light, the previously unexposed areas turned pink which then faded to a pale buff in about 5 minutes upon standing in room light.

In the following table are given the spectral responses obtained with various dye bases added as sensitizers to the following general formulation:

Gelatin—10 g.
Water—36 ml.
N-vinylcarbazole—2.5 g.
Carbon Tetrabromide—0.75 g.
Dye—2 mg.

Exposures to determine spectral responses were made with a Bausch & Lomb Monochromator using a tungsten lamp. Exposures were for 1 minute at each wavelength setting. If a test emulsion is sensitive enough to respond to this exposure at a particular wavelength, a negative image is formed when the exposed sheet is heated and the result is recorded as "NEG" (negative) in the table. If the emulsion is not sensitive enough to give a negative image with a 1-minute exposure, it may still be sensitive enough to give a "non-color-reaction," which can be shown by giving the sheet a blanket U.V. exposure and heating. This step produces color over the entire coating except in the area which was given the initial monochromator exposure. Thus, the monochromator-exposed area appears light against a darker background. Such a result is recorded as a "POS" (positive) in the table. A "POS" result indicates a lower sensitivity of the sensitized emulsion to the particular wavelength used than when a "NEG" result is obtained. No response to the initial monochromator exposure at a particular wavelength setting is indicated by "—" in the table.

The dye bases in the presence of an organic halogen compound are generally pale yellow and are sensitive to blue light. With the initial absorption of tungsten light, a dye base is converted to the corresponding dye, which absorbs in a longer wavelength region. The color of the dye may be pink, magenta, orange, or green. It is believed that the newly-formed dye is the actual photosensitizer. In the presence of an organic halogen compound, the formed dye bleaches or fades to a lighter tone, when left exposed to room light.

SPECTRAL SENSITIVITIES OF DYE-SENSITIZED N-VINYLCARBAZOLE-CARBON TETRA BROMIDE SYSTEMS

| | Monochromator Setting, mµ | | | | | |
|---|---|---|---|---|---|---|
| | 400 | 450 | 500 | 550 | 600 | 650 |
| (1) Control, no dye added | Neg. | Pos. | — | — | — | — |
| (2) 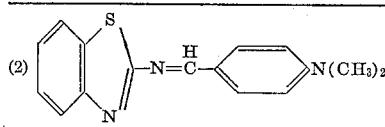 2-(2-aza-p-dimethylaminostyryl)-benzothiazole | Neg. | Neg. | Neg. | Neg. | — | — |
| (3) 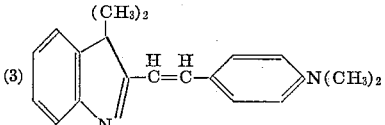 2-(p-dimethylaminostyryl)-3,3-dimethylindole | Neg. | Neg. | Neg. | Neg. | Neg. | — |
| (4) 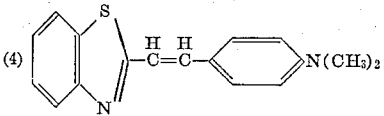 2-(p-dimethylamino-styryl)-benzothiazole | Neg. | Neg. | Neg. | — | — | — |

| | | Monochromator Setting, mμ | | | | | |
|---|---|---|---|---|---|---|---|
| | | 400 | 450 | 500 | 550 | 600 | 650 |
| (5) | 2-(p-dimethylamino-styrl)-quinoline | Neg. | Neg. | Neg. | Neg. | — | — |
| (6) | 2-(2-aza-p-dimethylaminostyryl)-benzimidazole | Neg. | Neg. | Neg. | Neg. | — | — |
| (7) | 2-(2-aza-p-dimethylaminostyryl)-thiazole | Neg. | Neg. | Neg. | Neg. | — | — |
| (8) | 4-(p-dimethylaminostyryl)-quinoline | Neg. | Neg. | Neg. | Neg. | Neg. | — |
| (9) | 2-(p-dimethylamino-styryl)-benzimidazole | Neg. | Neg. | Pos. | — | — | — |
| (10) | 2-[3-(3-ethyl-2(3)-benzothiazolylidene)-propenyl]-quinoline | Neg. | Neg. | Neg. | Neg. | Neg. | Neg. |
| (11) | 2-(p-dimethylaminostyryl)-pyridine | Neg. | Neg. | Neg. | Neg. | — | — |

The nitrogen containing compound, or other color-forming reactant, the organic halogen compound and a dye material as described above can be premixed prior to dispersion in the continuous phase and the combination stored prior to use, or shipped as such to be formulated at a later time. For example, a composition comprising a photosensitive combination of (1) an organic halogen having the formula $Br-C(X)(X')(X'')_n(CY_3)_{1-n}$, as defined above, (2) a compound that is capable of undergoing reaction on exposure to actinic light in the presence of the organic halogen, and (3) a styryl dye material (either dye form or dye base form) can be premixed for the above purpose; and such a composition comprises another embodiment of this invention.

(9) In addition to the various physical characteristics and phenomena already considered, the visible color of the dye (x) is important in that such will be indicative of its regions or bands of function with respect to actinic incident light. Particularly good results are obtained, for example, using the reds, blues and greens of the various dye groups, whereas less satisfactory results (from a practical point of view) are obtained using yellows (which will normally tend to absorb light in the wave bands in which control combinations (ab) find response).

Those skilled in the photographic arts will recognize readily that dye photosensitization is, itself, exhaustively considered in the literature. The fundamental principles thereof applicable thereto have already been set forth.

It will be appreciated that using substantially 0.1 mg. of rhodamine 6G and/or 0.2 mg. of Pinacyanole and/or 4-(p-dimethylaminostyryl)-quinoline (as typical sensitizers) particularly for each g. of the bromine-containing compounds (b) referred to in the other examples of our earlier applications hereinbefore incorporated by reference, one obtains different dye sensitizing effects typical of the synergism involved in each system; and typical of the nature of the instant invention.

Considerations of total energy, or total time for given wavelength, for initial (image) exposure The foregoing has demonstrated that the present system $(abx)$ dispersed in $(c)$ is capable of both positive and negative working mode under a given set of conditions including (1) the reagents $(ab)$ dyed by $(x)$ in certain concentrations and dispersed as $(abx)$ in certain continuous phases $(c)$, as well as (2) certain initial exposures (in terms of wavelength to which the system $abx$ is photo-responsive and also in terms of time or total energy of exposed radiation), certain intermediate heating steps, and certain final *blanket* exposures (also in the foregoing terms of wavelength and total radiation), followed by heating usually to effect the full color development. Heretofore, in this specification the initial exposure to visible light and the blanket exposure to U.V. has been demonstrated to show the positive mode; but comparable results may be obtained using a visible light sensitizing dye $(x)$ and using visible light in both exposures, if the times are correlated. The corresponding essential concept using the same wavelength of light for both exposures (in an NVC-HCE system) which contains no visible light sensitizer has already been demonstrated in our previous applications—as being essentially a function of the total energy of radiation (i.e. time) for the image-wise exposure, as compared to the total energy of radiation of the same U.V. wavelength for the blanket exposure subsequent to heating. Another corollary to this involves the negative mode demonstration with the same system $(abx)$ using the same wavelength, but for a longer period of time and this accomplishing a greater overall exposure of the light-struck areas to radiation during the image-wise exposure. This would indicate that the systems $(ab)$ and $(abx)$ are both capable, in many instances, of undergoing (I) an initial type of reaction upon being light-struck with a given *limited* amount of radiation energy (i.e. wavelength and time) and then heated, so as to obtain a non-color forming light-struck area—and so as to leave the previously non-light-struck area capable of color formation (i.e. positive mode); or (II) an initial type reaction upon being light-struck with a predetermined greater amount of radiation energy (i.e. including the same wavelength but a greater time) and heated to develop color in the originally light-struck areas (i.e. negative mode). It thus follows that the system $(abx)$—as well as the previously disclosed system $(ab)$—appears to undergo an initial photo-response to radiation which (if brief enough) leaves the system incapable of color formation during subsequent heating, blanket exposure and heating again; whereas the same system $(abx)$, when subjected to a greater total amount of radiation energy—e.g. at the same wavelength but for a greater time, appears to pass on through the previously described condition of incapability to form color and, instead, becomes color-forming in the very same light-struck areas (with the usual subsequent heating).

We thus introduce more clearly the additional factor of total radiation energy of initial exposure in a given light-struck area for a given system $(abx)$ (or $(ab)$ if one desires to use only U.V. as a radiation source).

The following resume brings out this overall concept, as well as its relationship to prior work herein and in our prior applications aforesaid:

Hitherto, a positive picture in one of the N-vinylcarbazole (NVC) brominated methane photosystems was produced by making an image-wise exposure of the emulsion to visible light, then developing it with a blanket ultraviolet (U.V.) exposure and heat.

The exposure to visible light causes a non-color-forming or color-deactivating reaction. The exposure to U.V. and heat causes a color-forming reaction. Although the U.V. exposure is a blanket exposure covering both the previously-exposed and previously-unexposed areas, color is developed selectively in the previously-unexposed areas since the areas already struck by visible light have undergone a non-color-forming reaction and remain essentially colorless.

The above description explains roughly how a positive line copy is produced. Actually, the density of the color formed in any given small area by the blanket U.V. exposure and heat is inversely proportional to the extent of the original visible light exposure received by that area. The greater this visible light exposure, the less the color density developed by the subsequent U.V. exposure and heat. Thus, tone rendition is possible.

We have also found that the same light source or light of the same wavelength band can be used for both the imaging and development exposures. Thus, it is possible to make an imaging exposure with a tunsten light source, then to develop the picture with the same tungsten light. A picture taken in a camera can be developed with the same sunlight used to form the image. These possibilities have been realized.

As previously mentioned, we appreciated earlier that the NVC-hexachloroethane system, which is mainly sensitive in the 350–370 m$\mu$ region, could give a positive picture by the following procedure:

(1) Imaging exposure. 15 seconds to a U.V. projection from a projector using a 500 w. high pressure mercury arc lamp.

(2) Heat at 350° F.

(3) Blanket exposure. 30 seconds to the same U.V. projector with the slide removed.

(4) Heat at 350° F.

In this case, the same U.V. source was used for both the imaging and development exposures. The difference between the two exposures was simply in the exposure time, the imaging exposure being shorter than the development exposure.

It is now apparent that the NVC-hexachloroethane system is not a special case and that other NVC-halogenated organic compound photosystems can be both imaged and developed by the same light source to produce a positive photograph.

Since sunlight and tungsten-light contain U.V. and a high pressure mercury arc light contains visible light, using one of these light sources for both the imaging and development exposures does not prove that light of a narrow wavelength band can be used for the two exposures in making a positive picture. Conclusive proof that this can be done with a light of a narrow wavelength band was obtained in our previous work on dye sensitization of NVC-halogenated organic compound systems, in which a monochromator was used for making the exposures.

EXAMPLE 2

The following tables give the type of photoreaction initiated—(1) non-color-forming, or (2) color-forming—in a few NVC-CBr$_4$ emulsions by exposure to a monochromator beam at various wavelength settings and exposure times.

It should be observed that the non-color-forming reaction takes place with shorter exposures than the color-forming reaction at any wavelength to which the emulsion is sensitive. The fact that the two reactions can be initiated by a single monochromator beam is clear indication that light of a single wavelength band can be used for both the imaging and blanket development exposures in the positive-working mode of the NVC-CBr$_4$ system Table 4

IV-A control formulation:
    Gelatin—10 g.
    Water—36 g.
    NVC—5 g.
    CBr$_4$—1 g.
    Antifoam B—6 drops
    Formalin—1 drop

TEST RESULTS FOR CONTROL FORMULATION IV-A

| Monochromator exposure, seconds | Wavelength setting, millimicrons | | | | | |
|---|---|---|---|---|---|---|
| | 400 | 450 | 500 | 550 | 600 | 650 |
| 2 | Non-color | — | — | — | — | — |
| 3 | Color | Non-color | — | — | — | — |
| 5 | do | Color | — | — | — | — |
| 15 | do | do | — | — | — | — |
| 30 | do | do | Non-color | — | — | — |
| 45 | do | do | do | — | — | — |
| 50 | do | do | do | — | — | — |
| 60 | do | do | do | — | — | — |
| 70 | | | do | | | |
| 80 | | | do | | | |
| 120 | | | Color | | | |
| 150 | | | do | | | |

Legend: N-C or non-color=non-color-forming reaction. C or color=color-forming reaction.—=no reaction. (Blank space)=not tested.

Table 5

V-A Orthochrome T-sensitized coating:
Formulation—Added 1.3 mg. of orthochrome to I control Formulation described prior to Table 4.

TEST RESULTS FOR FORMULATION V-A

| Monochromator exposure, seconds | Wavelength setting, millimicrons | | | | | |
|---|---|---|---|---|---|---|
| | 400 | 450 | 500 | 550 | 600 | 650 |
| 2 | Non-color | — | — | — | — | — |
| 3 | do | Non-color | Non-color | Non-color | — | — |
| 5 | do | do | do | do | N-C | N-C |
| 15 | do | do | do | do | N-C | N-C |
| 30 | Color | Color | Color | Color | C | N-C |
| 45 | do | do | do | do | C | N-C |
| 60 | do | do | do | do | C | N-C |

Legend: N-C or non-color=non-color-forming reaction. C or color=color-forming reaction.—=no reaction. (Blank space)=not tested.

Table 6

VI-A Rhodamine B-sensitized coating:
Formulation=Gelatin—10 g.
Water—36 g.
Mix A—5 g.
$CBr_4$—1 g.
Antifoam B—6 drops
Formalin—1 drop Mix A—2 mg. of Rhodamine B and 5 g. NVC were premixed by first melting NVC and adding the dye to it.

TEST RESULTS FOR FORMULATION VI-A

| Monochromator exposure, seconds | Wavelength setting, millimicrons | | | | | |
|---|---|---|---|---|---|---|
| | 400 | 450 | 500 | 550 | 600 | 650 |
| 2 | Non-color | — | — | — | — | — |
| 3 | Color | — | — | N-C | N-C | — |
| 5 | do | Non-color | — | Color | Color | — |
| 15 | do | Color | Non-color | do | do | — |
| 30 | do | do | Color | do | do | — |
| 45 | do | do | do | do | do | — |
| 60 | do | do | do | do | do | — |

Legend: N-C or non-color=non-color-forming reaction. C or color=color-forming reaction.—=no reaction. (Blank space)=not tested.

In the foregoing results of Example 2, the initial photoreaction occurring with variations in exposure time and wavelength setting are given for a few NVC-$CBr_4$ emulsions. The initial photoreaction may be a color-forming reaction which is completed simply by heating the emulsion after the exposure. If the initial reaction is non-color-forming then visual density is not produced by heating. By causing the background area to develop color with a blanket U.V. exposure and heat, the original area in which the non-color-forming reaction took place can be seen as a light area against the darker background.

These results show that in the spectral region in which an emulsion is sensitive, both the non-color-forming and color-forming reactions can be initiated by the same wavelength band of light from the monochromator. The factor which determines which of the the two reaction is to take place is the degree or extent of the light exposure. The non-color-forming reaction takes place with shorter exposures.

These results suggests that a positive-working process is possible with these emulsions using a short initial exposure to form an image with a given light source, followed by a longer or greater exposure with the same light source and heat to develop color in the previously-unexposed areas.

The results also suggests that a negative-working process is possible with these emulsions using light of the same wavelength band for both imaging and fixing, uing an imaging exposure with a given light source followed by heat to produce the image, then a shorter exposure to the same light source to color-deactivate the previously-unexposed areas.

In the following Examples, 3 through 8, light of a predetermined wavelength band (either from a monochromator or a tungsten light through a Corning CS 3–70 yellow filter) is used for both the imaging and development exposures.

EXAMPLE 3

The Rhodamine B-sensitized sheet used for this experiment was prepared according to the following formulation:

Gelatin—10 g.
Water—36 g.
Mix A [1]—5 g.
$CBr_4$—1 g.
Dow Corning Antifoam B—6 drops
Formalin—1 drop

[1] Mix A: Two (2) mg. of Rhodamine B and 5 g. of N-vinylcarbazole were premixed by first melting the NVC and adding the dye to the melt.

The coating was applied on vellum.
A coated sheet was exposed to an 8-diameter Kodachrome projection from a Bell & Howell 300 w. Headliner projector for 10 seconds. The projection was made through a Corning CS 3–70 yellow filter which transmits in the green and red regions of the spectrum, cutting out all U.V. and practically all of the blue.

The exposed sheet was warmed slightly with an electric hair dryer for about 10 seconds then given a blanket exposure with the same projector, with the Kodachrome slide removed, through the same CS 3–70 filter for 30 seconds. Upon heating, a positive picture was produced which was a monochromatic copy of the original Kodachrome transparency.

EXAMPLE 4

A control sheet was prepared according to the formulation given in Example 3 but without the Rhodamine B and was exposed and processed in the same manner. There was no color change and no image was produced in the coating. The NVC-CBr$_4$ coating without dye sensitization is sensitive in the U.V. and up to about 4,900 A. in the visible and therefore does not respond to the projected light which is in the green and red region of the spectrum.

This result confirms that only the green and red portion of the spectrum was used for both the imaging and development exposures in Example 3.

EXAMPLE 5

An Orthochrome T-sensitized emulsion was prepared according to the following formulation and coated on vellum:

Gelatin—10 g.
Water—36 ml.
Mix B [2]—5 g.
CBr$_4$—1 g.
Antifoam B—6 drops

[2] Mix B: Two (2) mg. of Orthochromate T and 5 g. of NVC were premixed by melting the NVC and adding the dye.

The coated sheet was exposed and processed according to the procedure given in Example 4. A positive picture was obtained.

EXAMPLE 6

A non-dye-sensitized NVC-CTB coated sheet portion (1) prepared according to Example 5 was exposed for 5 seconds to a square beam from Bausch & Lomb grating monochromator, using a tungsten light source and the wavelength setting at 450 m$\mu$. The exposed sheet portion (1) was warmed for about 5 seconds with an electric hair dryer then portion (3) was re-exposed to the same beam for 10 seconds. For the second exposure, the sheet portion (3) was shifted slightly so that the beam now exposed an area (3) which was not previously exposed as well as an area (2) which was previously exposed (as indicated on the following Sketch I).

SKETCH I

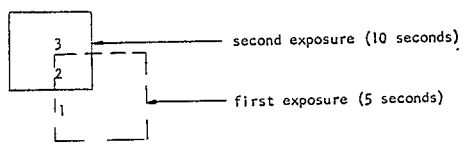

The foregoing exposed sheet portions (1), (2) and (3) are then heated. No color or very little color developed in the area (1) receiving only the first exposure and in the overlap area receiving two exposures (2), but color developed in area (3) (as indicated in Sketch II).

SKETCH II

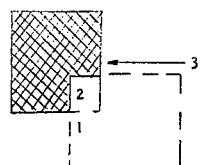

As indicated in the above Sketch II, color developed in the area receiving only the second exposure (3). The upper left corner (2) of the first exposed area (1) in the overlapped area was clearly defined.

This method of exposure with a monochromator beam is equivalent to the exposure procedure in making a positive picture. The overlap area (2), which is light, is the area which received both the initial imaging and black development exposures and corresponds to the light areas in a positive picture. The dark area (3) corresponds to the dark or shade areas in a positive picture. The light area (1) corresponds to what constitutes a non-photoresponsive area under the limited *time* conditions exposure.

EXAMPLE 7

A vellum sheet was coated with the following formulation:

Gelating—10 g.
Water—36 ml.
NVC—5 g.
CBr$_4$—1 g.
Pinacyanole—0.64 mg.
Antofoam B—6 drops.

The sheet was exposed to a Kodachrome projection from a Bell & Howell Headliner projector through a Corning CS 3–70 yellow filter for one minute; warmed; given a blanket exposure with the same projector with the slide removed through the same CS 3–70 filter for 5 minutes; heated. A positive picture was obtained which was a monochromatic copy of the original Kodachrome transparency.

EXAMPLE 8

The coating in Example 7 was repeated with Capri blue (0.58 mg.) replacing pinacyanole in the formulation. The sheet was exposed to a Kodachrome projection from a Bell & Howell Headliner projector through a Corning CS 3–70 yellow filter for 2 minutes; warmed; given a blanket exposure with the same projector with the slide removed through the same CS 3–70 filter for 8 minutes; heated. A positive picture was obtained.

Examples 7 and 8 show that even with relatively slow emulsions which require long first and second exposures, the process for making positive pictures still works.

EXAMPLE 9

A reflex exposure was made with the Rhodamine B-sensitized sheet such as that of Example 3. The sheet was exposed in front of an original, the emulsion side away from the light, in a Verifax Regent Copier for 2 seconds. The sheet was warmed then exposed with the emulsion facing the light, with the original removed, for 5 seconds. The sheet was heated to develop a (wrong-reading) positive image.

EXAMPLE 10

The procedure of Example 9 was repeated except this time the first exposure was made with the emulsion facing the light or away from the original and with a clear sheet of paper placed in front of the emulsion. After warming, the clear sheet of paper and the original were removed and the emulsion exposed to direct light from the lamps for 5 seconds. The sheet upon heating developed a direct-reading positive image.

In the process for making a positive image with the same light source for both the imaging and development exposures, the imaging exposure is short and the development exposure is longer.

The imaging exposure need to obtain adequate deactivation of the coating to prevent or inhibit color formation by the subsequent development exposure and heat and the development exposure needed to develop a satisfactory or usable visual image density will vary with the intensity and wavelength band of light used and the sensitivity of the emulsion. One cannot specify the exposure to be used without at the same time specifying the wavelength band of light and the emulsion to be used.

On the other hand, a ratio of the second blanket exposure to the first imaging exposure for a given light source can probably be given which will in a general way apply to most emulsions and wavelengths of light.

This ratio was determined for a Rhodamine-sensitized emulsion such as described in Example 3 and for a non-sensitized $NVC\text{-}CBr_4$ emulsion such as described in Example 4. For the Rhodamine-sensitized emulsion the 550 m$\mu$ monochromator beam was used for making the exposures while for the non-sensitized $NVC\text{-}CBr_4$ emulsion, the 450 m$\mu$ beam was used.

EXAMPLE 11

Two overlapping exposures were made successively on each test sample according to the procedure described in Example 6, each of the exposures being varied to give different ratios of the two exposures. The first (non-color-forming) exposure was for 3, 4, or 5 seconds (Sketches A, B and C, respectively) while the second (color-forming) exposure ranged from 5 to 15 seconds, in the corresponding sketches indicated below:

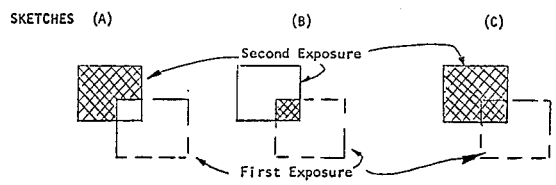

In Sketch (A) both the initial deactivating exposure and the color-forming exposure were adequate. The upper left corner of the first exposure is clearly defined and the lower right corner of the second exposure is not or is barely visible.

In Sketch (B) both initial and color-forming exposures were inadequate. The overlap area is very slightly darker than the other areas.

In Sketch (C) the initial exposure was inadequate while the color-forming exposure was adequate. Color formation in the overlap area is not sufficiently inhibited although the color is not as strong as in the area receiving only the second exposure. The lower right corner of the second exposure is clearly defined while the upper left corner of the first exposure is fuzzy.

Color density increases with exposure from the minimum exposure which gives usable or acceptable color density to the exposure which gives the maximum possible density with the emulsion used. The non-color-forming first exposure increases inhibition to color formation with increasing length of exposure, but soon reaches an optimum because lengthening the exposure further results in color formation.

The ratio of the two (second to first) exposures is minimum when the color-forming second exposure gives the minimum usable image density and the first exposure is that which gives maximum color deactivation. The ratio is maximum when the second exposure gives the maximum possible density and the first exposure is again that which gives maximum color deactivation.

When the initial exposure is less than the optimum, the minimum ratio increases and the maximum ratio decreases.

This optimum exposure for color-deactivation was about 5 seconds for Rhodamine B-sensitized emulsion under our experimental conditions. A 6-second exposure, followed by heating, produced an acceptable color density; therefore, the minimum ratio of the two exposures was 6/5 for this particular emulsion. After a 5-second initial exposure, a second exposure for 50 seconds $$\left(\frac{10}{1} \text{ ratio}\right)$$

and 75 seconds $$\left(\frac{15}{1} \text{ ratio}\right)$$

produced little color in the overlap area, indicating strong deactivation. The 15/1 ratio was the maximum tried.

An initial exposure for 5 seconds was found to be also right for the non-sensitized $NVC\text{-}CBr_4$ emulsion and the minimum and maximum ratios for the two exposures were the same as those for the Rhodamine B-sensitized emulsion. (That 5 seconds should be optimum initial exposure for both emulsions is coincidental since the emulsions were exposed to different wavelengths and, therefore, to different intensities of light.)

The ratio of the two exposures in the case where a monochromator is used is the ratio of the respective exposure times since the beam intensity is the same for the two exposures. The ratio of the exposures when a slide projector is used is not the ratio of the exposure times since the slide is removed for the second exposure and the intensity of the projected beam is greater. It is possible, therefore, to use a given exposure time for the imaging exposure, then to use a shorter exposure time for the blanket exposure with the slide removed.

The photoreaction initiated by the first brief exposure is a continuing reaction which goes on even after the light is turned off. For maximum deactivation it is desirable to allow this reaction to go its full extent. Deactivation appears to be maximum when the exposed emulsion is allowed to stand at room temperature in the dark for 10 minutes or longer, although deactivation is noticeable even after 1 minute standing.

For intervals shorter than 1 minute between the two exposures, the sheet is warmed (temperature less than 160° F.) after the initial exposure.

To increase the speed or sensitivity of a Rhodamine B-sensitized emulsion, the emulsion-coated sheet is (1) warmed or (2) briefly exposed to visible light until the pink color of the dye is fully developed or (3) both before making the first imagewise exposure.

In general, the upper limit of dye sensitizing for purposes of the invention need not extend to the approximate upper limit (i.e. about 25,000 A.) of the sun's radiation since distinctions in the high infra-red area between photo and thermal reaction become more difficult. For practical purposes, the following are generally considered maximum for photosensitization (with wavelengths indicated in parentheses):

Kryptocyanin—(800 m$\mu$ or 8000 A.)
Neocyanin—(9500 A.)
Xenocyanin—(12000–13500 A.)

EXAMPLE 12

Formulation:
  Cornstarch—10 g.
  Water—90 cc.
  NVC—5 g.
  $CBr_4$—0.5 g.

Sensitizing dye—amount specified in table.
  Monochromator exposure—1 minute for each wavelength setting.
  Blanket exposure with sun lamp.

TABLE 7

| | Dye Class | Amt. of dye, mg. | 400 | 450 | 500 | 550 | 600 | 650 |
|---|---|---|---|---|---|---|---|---|
| (1) Methyl violet | Triphenylmethyl | 0.50 | Neg. | Neg. | Pos. | Pos. | Neg. | Pos. |
| (2) Methyl orange | Azo | 0.56 | Neg. | Neg. | Pos. | Pos. | — | — |
| (3) Erioglaucine | Triphenylmethyl | 0.69 | Neg. | Neg. | Pos. | Pos. | Pos. | Pos. |
| (4) Brilliant green | do | 0.80 | Neg. | Neg. | Pos. | — | — | Pos. |
| (5) Nigrosin | Phenazine | 0.87 | Neg. | Neg. | Pos. | Pos. | Pos. | — |
| (6) Capri blue | Oxazine | 0.58 | Neg. | Neg. | Pos. | Pos. | Pos. | Pos. |
| (7) Eosin B | Eosin | 0.50 | Neg. | Neg. | Pos. | Pos. | — | — |
| (8) Ethyl red MeOH—NaOH | Methine (cyanine) | 1.43 | Neg. | Neg. | Pos. | Pos. | Pos. | — |
| (9) Aliazrin MeOH—NaOH | Anthraquinone | 1.76 | Neg. | Neg. | Pos. | Pos. | — | — |
| (10) Acridine orange | Acridine | 1.15 | Neg. | Neg. | Neg. | Pos. | — | — |
| (11) Safranine O | Phenazine | .69 | Neg. | Neg. | Pos. | Pos. | — | — |
| (12) Phenosafranin | do | .59 | Neg. | Neg. | Pos. | Pos. | — | — |
| Control | | None | Neg. | Neg. | Pos. | Pos. | — | — |

EXAMPLE 13

Formulation:
Cornstarch—10 g.
Water—90 cc.
NVC—5 g.
CBr$_4$—1.0 g.
Sensitizer—amount specified in table.

Monochromator exposure 1 minute for Bromcresol green and all other dyes (except 5 minutes for neocyanine as shown on Table 8).

TABLE 8

| | Dye Class | Amt. of dye, mg. | 400 | 450 | 500 | 550 | 600 | 650 |
|---|---|---|---|---|---|---|---|---|
| (13) Neocyanine | Methine (cyanine) | 0.61 | Neg. | Pos. | Pos. | Pos. | — | Pos. |
| (14) Bromcresol green MeOH—NaOH | Sulfonphthalein | 1.62 | Neg. | Neg. | Neg. | — | — | — |
| Control | | None | Neg. | Neg. | Pos. | — | — | — |
| (15) Rhodamine 6G | Rhodamine | 2.0 | Neg. | Neg. | Neg. | Neg. | — | — |
| (16) Rose bengal | Eosin | 10.0 | Neg. | Neg. | Pos. | Pos. | — | — |
| (17) Orthochrome T | Methine (cyanine) | 1.3 | Neg. | Neg. | Neg. | Neg. | Neg. | Neg. |
| (18) Rhodamine S | Rhodamine | 2.0 | Neg. | Neg. | Pos. | Pos. | Pos. | — |
| (19) Erythrosin | Eosin | 10.3 | Neg. | Neg. | Pos. | Neg. | — | — |

Comparable results are obtained by substituting gelatin or polyvinyl alcohol for the starch in the binder used in the formulation of Example 13.

It will thus be seen that, although it has been found that usually better results are obtained if the initial brief non-color forming exposure is carried out using a dye sensitized system (such as a Rhodamine B-sensitized system) which is exposed briefly, i.e., for less than about 5 seconds (to visible light in the actinic range), followed by brief heating and then blanket exposure to ultraviolet light with a final heating step to bring out the image in accordance with the positive mode or system; it must be appreciated that the blanket ultraviolet light is not absolutely necessary in the second exposure to actinic light and excellent results are obtained using actinic light which is substantially the same as the visible actinic light used initially for the brief (i.e. 5 seconds or less) initial decolorizing exposure in this same procedure, in accordance with the positive-working mode of the invention. Of course, in accordance with the negative working mode of the invention, the initial exposure to such visible actinic light is carried out for a period of time that is more than 5 seconds, i.e. at least 6 and preferably 10 or 15 seconds, so that an initial development of color will take place in the initially light-struck areas. It will thus be seen that as a general rule of comparison, if the positive-working mode is to be carried out the initial exposure to actinic light is carried out for a period of time that is at the most about ⅚ and preferably about ½ to ⅓ of the period of exposure time required for the use of the same actinic light to produce color in the negative working mode of the same system.

Expressing the positive-working method accordingly, it will be seen that the invention contemplates a positive-working photographic method.

It will be understood that modifications and variations may be effected without departing from the scope of the novel concepts of the present invention.

We claim:
1. In a method of producing a photographic material which comprises dispersing (1) an aryl amine free from nuclear substitution in the position para to nuclear attachment of said amine nitrogen atom, and (2) an organic halogen compound selected from the group of compounds which produce free radicals or ions upon exposure to light of a suitable wavelength and in which there is present at least one active halogen selected from the groups consisting of chlorine, bromine and iodine, attached to a carbon atom having not more than one hydrogen atom attached thereto in (3) an aqueous dispersion medium formed of a solid-hydrophilic-film-forming vehicle, in which said nitrogen atom-containing compound and said organic halogen compound are substantially insoluble, and effecting formation of discrete globules of light-absorbing combination of said aryl amine and said organic halogen compound, said combination being responsive to actinic light to yield an image of selective light absorptivity distinct from that of said combination and said aryl amine and organic halogen compound; the improvement which comprises introducing into said material a photographic spectral sensitizing dye material, separate and distinct from the components of said combination, having preferential attraction for said combination and effecting a photosensitive spectral response to said combination, differing from the spectral response of each of said components per se and said combination in the absence of said dye material, said dye material being in a form selected from the dye form and dye base form.

2. In a method of producing a photographic material which comprises dispersing (1) an N-vinyl compound, and (2) an organic halogen compound selected from the group of compounds which produce free radicals or ions upon exposure to light of a suitable wavelength and in which there is present at least one active halogen selected from the group consisting of chlorine, bromine and iodine, attached to a carbon atom having not more than one hydrogen atom attached thereto, in an aqueous dispersion medium, formed of a solid-hydrophilic-film-forming vehicle, in which said N-vinyl compound and organic halogen compound are substantially insoluble, and effecting formation of discrete globules of a light-absorbing combination of said N-vinyl compound and said organic halogen compound, said combination being responsive to actinic light to yield an image of selective light absorptivity distinct from that of said combination and said N-vinyl compound and organic halogen compound; the improvement which comprises introducing into said material a photographic spectral sensitizing dye material, separate and distinct from the components of said combination, having preferential attraction for said combination and effecting a photosensitive spectral response to said combination, differing from the spectral response of each of said components per se and said combination in the absence of said dye material, said dye material being in a form selected from the dye form and dye base form.

3. The method of claim 2 wherein said dye material is selected from the rhodamines, the pinacyanoles, the Eosins, the triphenylmethanes, the thiazines, the anthraquinonoids, and the styryl dyes and dye bases.

4. In a method of producting a photographic material which comprises dispersing N-vinylcarbazole and carbon tetrabromide in a continuous liquid phase formed of an aqueous solid-hydrophilic-film-forming vehicle and effecting solidification of discrete globules of a light-absorbing combination of said N-vinylcarbazole and said carbon tetrabromide; the improvement which comprises introducing into said material a photographic spectral sensitizing dye material, separate and distinct from the components of said combination, having preferental attraction for said combination and effecting a photosensitive spectral response to said combination, differing from the spectral response of each of said components per se and said combination in the absence of said dye material, said dye material being in a form selected from the dye form and dye base form.

5. A composition comprising (1) a photosensitive dispersed phase in the form of discrete globules of a combination of (a) an aryl amine free from nuclear substitution in the position para to nuclear attachment of said amine nitrogen atom, and (b) an organic halogen compound selected from the group of compounds which produce free radicals or ions upon exposure to light of a suitable wavelength and in which there is present at least one active halogen selected from the group consisting of chlorine, bromine and iodine, attached to a carbon atom having not more than one hydrogen atom attached thereto, in (2) an aqueous dispersion medium of a solid-hydrophilic-film-forming vehicle in which said dispersed phase is substantially insoluble; said composition containing a photographic spectral sensitizing dye material, separate and distinct from the components of said combination, having preferential attraction for said combination and effecting a photosensitive spectral response to said combination differing from the spectral response of each of the components thereof per se and said combination in the absence of said dye material, said dye material being in a form selected from the dye form and the dye base form.

6. A composition comprising (1) a photosensitive dispersed phase in the form of discrete globules of a combination of (a) an N-vinyl compound and (b) an organic halogen compound selected from the group of compounds which produce free radicals or ions upon exposure to light of a suitable wavelength and in which there is present at least one active halogen selected from the group consisting of chlorine, bromine and iodine, attached to a carbon atom having not more than one hydrogen atom attached thereto in (2) an aqueous dispersion medium of a solid-hydrophilic-film-forming vehicle in which said dispersed phase is substantially insoluble, said composition containing a photographic spectral sensitizing dye material, separate and distinct from the components or said combination, having preferential attraction for said combination and effecting a photosensitive spectral response to said combination differing from the spectral response of each of the components thereof per se and said compination in the absence of said dye material, said dye material being in a form selected from the dye form and the dye base form.

7. The composition of claim 6 wherein said dyes material is selected from the rhodamines, the pinacyanoles, the Eosins, the triphenylmethanes, the thiazines, the anthraquinonoids, and the styryl dyes and dye bases.

8. The composition of claim 6 wherein said dispersion medium is selected from the group consisting of gelatin, casein, polyvinyl alcohol, gum arabic, starch, sodium carboxymethylcellulose and hydroxyethylcellulose.

9. The composition of claim 6 wherein said N-vinyl compound is capable of undergoing two separate and distinct reactions on exposure to actinic light and in the presence of said organic halogen compound.

10. A composition comprising (1) a photosensitive dispersed phase in the form of discrete globules of a combination of (a) a nitrogen atom-containing compound selected from the group consisting of N-vinyl carbazole, N-ethyl carbazole, indole and diphenylamine, and (b) an organic halogen compound selected from the group of compounds which produce free radicals or ions upon exposure to light of a suitable wavelength and in which there is present at least one active halogen selected from the group consisting of chlorine, bromine and iodine, attached to a carbon atom having not more than one hydrogen atom attached thereto in a (2) aqueous dispersion medium of a solid-hydrophilic-film-forming vehicle in which said dispersed phase is substantially insoluble, said combination being responsive to active light to yield an image of selective light absorptivity distinct from that of said combination and said nitrogen atom-containing compound and organic halogen compound; said composition containing a photographic spectral sensitiziing dye material, separate and distinct from the components of said combination, having preferential attraction for said combination and effecting a photosensitive spectral response to said combination differing from the spectral response of each of the components thereof per se and said combination in the absence of said dye material, said dye material being in a form selected from the dye form and the dye base form.

11. A composition consisting essentially of (1) a photosensitive dispersed phase in the form of substantially fine spheroidal solid particles of N-vinylcarbazole and carbon tetrabromide. fused to a mild yellow substantially homogeneous combination in (2) an aqueous, substantially translucent continuous solid-hydrophilic-film-forming-phase in which the dispersed phase is substantially insoluble, said combination being selectively photo-reactive to produce a coloring agent and to produce a photo-insensitive agent of substantially the same visible appearance as said photosensitive combination, said composition containing a photographic spectral sensitizing dye material, separate and distinct from the components of said combination, having preferential attraction for said combination and effecting a photosensitive spectral response to said combination, differing from the spectral response of each of said components per se and said combination in the absence of said dye material, said dye material being in a form selected from the dye form and dye base form.

12. A composition consisting essentially of (1) a photosensitive dispersed phase in the form of substantially fine spheroidal solid particles of N-vinylcarbazole and hexachloroethane fused into a substantially colorless homogeneous combination in (2) an aqueous, substantially translucent continuous solid-hydrophilic-film-forming-phase in which the dispersed phase is substantially insoluble, said combination being selectively photo-reactive to produce a coloring agent and to produce a photo-insensitive agent of substantially the same visible appearance as said photosensitive combination, said composition containing a photographic spectral sensitizing dye material, separate and distinct from the components of said combination, having preferential attraction for said combination and effecting a photosensitive spectral response to said combination differing from the spectral response of each of the components thereof per se and said combination in the absence of said dye material, said dye material being in the form selected from the dye form and the dye base form.

13. A combination which is photosensitive in a hydrophilic binder, comprising
   (1) an organic halogen having the formula $$Br-C-(X)(X')(X'')_n(CY_3)_{1-n}$$

wherein X, X' and X'' are halogens, each Y is independently selected from the group consisting of halogen, hydrogen, hydroxy, methyl and methylol, and $n$ is selected from 0 and 1, such that when $n$ is 0, X and X' are Br,
   (2) an aromatic amine, and
   (3) a styryl dye material in a form selected from the dye form and dye base form.

14. The composition of claim 13 wherein said styryl dye or dye base is 4-(p-dimethylaminostyryl)-quinoline dye or dye base.

15. The composition of claim 13 wherein said styryl dye material is in the dye base form.

16. The composition of claim 15 wherein said compound is an N-vinyl compound.

17. The composition of claim 16 wherein said compound is N-vinylcarbazole and said organic halogen is carbon tetrabromide.

18. The composition of claim 17 wherein said styryl dye or dye base is 4-(p-dimethylaminostyryl)-quinoline dye or dye base.

References Cited

UNITED STATES PATENTS

| 3,042,517 | 7/1962 | Wainer | 96—90 |
| 3,140,947 | 7/1964 | Faris | 96—48 |

NORMAN G. TORCHIN, Primary Examiner

R. E. FICHTER, Assistant Examiner

UNITED STATES PATENT OFFICE
CERTIFICATE OF CORRECTION

Patent No. 3,503,745　　　　　　　　Dated March 31, 1970

Inventor(s) Yoshikazu Yamada et al.

It is certified that error appears in the above-identified patent and that said Letters Patent are hereby corrected as shown below:

Column 40, lines 3 and 4, "compound" should read -- amine --; lines 5 and 6, "compound" should read -- amine --.

Signed and sealed this 27th day of April 1971.

(SEAL)
Attest:

EDWARD M. FLETCHER, JR.　　　　　　　WILLIAM E. SCHUYLER, JR.
Attesting Officer　　　　　　　　　　Commissioner of Patents